US007382253B2

(12) United States Patent
Oliveras

(10) Patent No.: US 7,382,253 B2
(45) Date of Patent: Jun. 3, 2008

(54) REMOTE DYNAMIC INGRESS/EGRESS INVENTORY SECURITY SYSTEM

(76) Inventor: R. Martin Oliveras, 7 Bell Dr., Morristown, NJ (US) 07960

( * ) Notice: Subject to any disclaimer, the term of this patent is extended or adjusted under 35 U.S.C. 154(b) by 212 days.

(21) Appl. No.: 10/981,720

(22) Filed: Nov. 5, 2004

(65) Prior Publication Data

US 2006/0097871 A1     May 11, 2006

(51) Int. Cl.
*G08B 13/14* (2006.01)
(52) U.S. Cl. .................. 340/572.1; 235/385; 340/556; 340/573.1; 705/28
(58) Field of Classification Search ............ 340/572.1, 340/572.4, 573.1, 573.4, 539.11–539.13, 340/555–557, 539.23, 5.92; 705/28; 235/385
See application file for complete search history.

(56) References Cited

U.S. PATENT DOCUMENTS

| | | | |
|---|---|---|---|
| 5,189,393 A | | 2/1993 | Hu |
| 5,406,256 A | | 4/1995 | Ledel et al. |
| 5,532,824 A | | 7/1996 | Harvey et al. |
| 5,664,113 A | * | 9/1997 | Worger et al. .............. 705/28 |
| 5,708,423 A | * | 1/1998 | Ghaffari et al. .......... 340/572.4 |
| 6,044,952 A | | 4/2000 | Haggerty et al. |
| 6,225,905 B1 | | 5/2001 | Tyren et al. |
| 6,373,389 B1 | * | 4/2002 | Przygoda, Jr. et al. ... 340/572.4 |
| 6,417,771 B1 | | 7/2002 | Tyren |
| 6,825,766 B2 | * | 11/2004 | Hewitt et al. .............. 340/5.92 |
| 2002/0104013 A1 | * | 8/2002 | Ghazarian .................. 713/200 |
| 2004/0217864 A1 | * | 11/2004 | Nowak et al. ........... 340/572.1 |
| 2005/0035862 A1 | * | 2/2005 | Wildman et al. ........ 340/573.1 |

* cited by examiner

*Primary Examiner*—Thomas J Mullen, Jr.

(57) ABSTRACT

A system provides an inventory of first and second class objects which are distributed in first and second defined locations. The first and second locations are accessible to each other via a common pathway. The system comprises: a motion sensor for producing a detection signal when the presence or motion of an object is detected while present or moving through the pathway; a universal signal transmitter which is responsive to the detection signal for transmitting a universal signal; and a unique identity signal detector for detecting the presence or absence of a unique identity signal from the detected object. Each first and second class object is capable of transmitting a unique identity signal in response to the universal signal. An information storage device is responsive to the unique identity signal detector and is capable of storing information corresponding to the presence or absence of an identity signal from the detected object.

86 Claims, 16 Drawing Sheets

FIGURE 7A: TIME LINE OF FILE INVENTORY / PERSONNEL CONFIGURATIONS

| TIME | R1/L1 | R2/L2 | R3/L3 | FILE ROOM | SECRETARIAL AREA | EXIT |
|------|-------|-------|-------|-----------|------------------|------|
| T(0) | F(1,2,3)<br>L(1) | F(4,5,6)<br>L(2) | F(7,8,9)<br>L(3) | F(10,11,12)<br>C(1) | F(13,14,15)<br>S(1,2*)<br>C(2*) | |
| T(1) | F(2,3)<br><br>-F(1)<br>-L(1) | F(4,5,6)<br>L(2) | F(7,8,9)<br>L(3) | F(10,11,12)<br>C(1) | F(13,14,15)<br>S(1,2*)<br>C(2*)<br>+F(1)<br>+L(1) | |
| T(2) | F(2,3) | F(4,5,6)<br>L(2) | F(7,8,9)<br>L(3) | F(10,11,12)<br>C(1) | F(13,14,15,1)<br>S(1,2*)<br>C(2*)<br>L(1) | |
| T(3) | F(2,3) | F(4,5,6)<br>L(2) | F(7,8,9)<br>L(3) | F(10,11,12)<br>C(1)<br><br>+F(1)<br>+L(1) | F(13,14,15,1)<br>S(1,2*)<br>C(2*)<br>-F(1)<br>-L(1) | |
| T(4) | F(2,3) | F(4,5,6)<br>L(2) | F(7,8,9)<br>L(3) | F(10,11,12,1)<br>C(1)<br>L(1) | F(13,14,15)<br>S(1,2*)<br>C(2*) | |

FIGURE 7B: TIME LINE OF FILE INVENTORY / PERSONNEL CONFIGURATIONS (CONTINUED)

| TIME | R1/L1 | R2/L2 | R3/L3 | FILE ROOM | SECRETARIAL AREA | EXIT |
|---|---|---|---|---|---|---|
| T(5) | F(2,3) | F(4,5,6) L(2) | F(7,8,9) L(3) | F(10,11,12,1) C(1) -L(1) | F(13,14,15) S(1,2*) C(2*) +L(1) | |
| T(6) | F(2,3) | F(4,5,6) L(2) | F(7,8,9) L(3) | F(10,11,12,1) C(1) | F(13,14,15) S(1,2*) C(2*) L(1) | |
| T(7) | F(2,3) +L(1) | F(4,5,6) L(2) | F(7,8,9) L(3) | F(10,11,12,1) C(1) | F(13,14,15) S(1,2*) C(2*) -L(1) | |
| T(8) | F(2,3) L(1) | F(4,5,6) L(2) | F(7,8,9) L(3) | F(10,11,12,1) C(1) | F(13,14,15) S(1,2*) C(2*) | |
| T(9) | F(2,3) L(1) | F(5,6) -F(4) -L(2) | F(7,8,9) -L(3) | F(10,11,12,1) C(1) | F(13,14,15) S(1,2*) C(2*) +F(4) +L(2,3) | |
| T(10) | F(2,3) L(1) | F(5,6) | F(7,8,9) | F(10,11,12,1) C(1) | F(13,14,15,4) S(1,2*) C(2*) L(2,3) | |

FIGURE 7C: TIME LINE OF FILE INVENTORY / PERSONNEL CONFIGURATIONS (CONTINUED)

| TIME | R1/L1 | R2/L2 | R3/L3 | FILE ROOM | SECRETARIAL AREA | EXIT |
|---|---|---|---|---|---|---|
| T(11) | F(2,3)<br>L(1) | F(5,6)<br><br><br>+L(2) | F(7,8,9)<br><br>+F(4)<br>+L(3) | F(10,11,12,1)<br>C(1) | F(13,14,15)<br>S(1,2*)<br>C(2*)<br>-F(4)<br>-L(2,3) | |
| T(12) | F(2,3)<br>L(1) | F(5,6)<br>L(2) | F(7,8,9,4)<br>L(3) | F(10,11,12,1)<br>C(1) | F(13,14,15)<br>S(1,2*)<br>C(2*) | |
| T(13) | F(2,3)<br>L(1) | F(5,6)<br>L(2) | F(7,8,9,4)<br>L(3) | F(10,11,12,1)<br>C(1)<br>+C(2*) | F(13,14,15)<br>S(1,2*)<br>-C(2*) | |
| T(14) | F(2,3)<br>L(1) | F(5,6)<br>L(2) | F(7,8,9,4)<br>L(3) | F(10,11,12,1)<br>C(1,2*) | F(13,14,15)<br>S(1,2*) | |
| T(15) | F(2,3)<br>L(1)<br>(_ALARM_)<br>(_ALARM_) | F(5,6)<br>L(2) | F(7,8,9,4)<br>L(3) | F(11,12,1)<br>C(1)<br>-F(10)<br>-C(2*) | F(13,14,15)<br>S(1,2*)<br>+F(10)<br>+C(2*) | |
| T(16) | F(2,3)<br>L(1)<br>(_ALARM_) | F(5,6)<br>L(2) | F(7,8,9,4)<br>L(3) | F(11,12,1)<br>C(1) | F(13,14,15,10)<br>S(1,2*)<br>C(2*) | |

FIGURE 7D: TIME LINE OF FILE INVENTORY / PERSONNEL CONFIGURATIONS (CONTINUED)

| TIME | R1/L1 | R2/L2 | R3/L3 | FILE ROOM | SECRETARIAL AREA | EXIT |
|---|---|---|---|---|---|---|
| T(17) | F(2,3) L(1) | F(5,6) L(2) | F(7,8,9,4) L(3) | F(11,12,1) C(1) +F(10) +S(1) | F(13,14,15) S(2*) C(2*) -F(10) -S(1) | |
| T(18) | F(2,3) L(1) | F(5,6) L(2) | F(7,8,9,4) L(3) | F(10,11,12,1) C(1) S(1) | F(13,14,15) S(2*) C(2*) | |
| T(19) | F(2,3) L(1) | F(5,6) L(2) | F(7,8,9,4) L(3) | F(10,11,12,1) C(1) -S(1) | F(13,14,15) S(2*) C(2*) +S(1) | |
| T(20) | F(2,3) L(1) | F(5,6) L(2) | F(7,8,9,4) L(3) | F(10,11,12,1) C(1) | F(13,14,15) S(1,2*) C(2*) | |
| T(21) | F(2,3) L(1) (ALARM) (ALARM) | F(5,6) L(2) | F(7,8,9,4) L(3) | F(10,11,12,1) C(1) | F(14,15) S(1) C(2*) -F(13) -S(2*) | +F(13) +S(2*) |
| T(22) | F(2,3) L(1) (ALARM) | F(5,6) L(2) | F(7,8,9,4) L(3) | F(10,11,12,1) C(1) | F(14,15) S(1) C(2*) | F(13) S(2*) |

FIGURE 7E: TIME LINE OF FILE INVENTORY / PERSONNEL CONFIGURATIONS (CONTINUED)

| TIME | R1/L1 | R2/L2 | R3/L3 | FILE ROOM | SECRETARIAL AREA | EXIT |
|---|---|---|---|---|---|---|
| T(23) | F(2,3) <br> L(1) <br> *(ALARM)* | F(5,6) <br> L(2) | F(7,8,9,4) <br><br> -L(3) | F(10,11,12,1) <br> C(1) | F(14,15) <br> S(1) <br> C(2*) <br> +L(3) | F(13) <br> S(2*) |
| T(24) | F(2,3) <br> L(1) <br> *(ALARM)* | F(5,6) <br> L(2) | F(7,8,9,4) | F(10,11,12,1) <br> C(1) | F(14,15) <br> S(1) <br> C(2*) <br> L(3) | F(13) <br> S(2*) |
| T(25) | F(2,3) <br> L(1) <br> *(ALARM)* | F(5,6) <br> L(2) | F(7,8,9,4) | F(10,11,12,1) <br> C(1) | F(14,15) <br> S(1) <br> C(2*) <br> -L(3) | F(13) <br> S(2*) <br><br> +L(3) |
| T(26) | F(2,3) <br> L(1) <br> *(ALARM)* | F(5,6) <br> L(2) | F(7,8,9,4) | F(10,11,12,1) <br> C(1) | F(14,15) <br> S(1) <br> C(2*) | F(13) <br> S(2*) <br> L(3) |
| T(27) | F(2,3) <br> L(1) <br> *(ALARM)* <br> *(ALARM)* <br> *(ALARM)* | F(5,6) <br> L(2) | F(7,8,9,4) | F(10,11,12,1) <br> C(1) | F(14,15) <br> S(1) <br> C(2*) <br> +F(13) <br> +S(2*) <br> +L(3) | <br><br><br><br> -F(13) <br> -S(2*) <br> -L(3) |

FIGURE 7F: TIME LINE OF FILE INVENTORY / PERSONNEL CONFIGURATIONS (CONTINUED)

| TIME | R1/L1 | R2/L2 | R3/L3 | FILE ROOM | SECRETARIAL AREA | EXIT |
|---|---|---|---|---|---|---|
| T(28) | F(2,3) L(1) | F(5,6) L(2) | F(7,8,9,4) | F(10,11,12,1) C(1) | F(13,14,15) S(1,2*) C(2*) L(3) | |
| T(29) | F(2,3) L(1) (ALARM) | F(5,6) L(2) | F(7,8,9,4) | F(10,11,12,1) C(1) | F(13,14,15) S(1,2*) C(2*) L(3) +X(1) | -X(1) |
| T(30) | F(2,3) L(1) (ALARM) | F(5,6) L(2) | F(7,8,9,4) | F(10,11,12,1) C(1) | F(13,14,15) S(1,2*) C(2*) L(3) X(1) | |
| T(31) | F(2,3) L(1) (ALARM) (ALARM) | F(5,6) L(2) | F(7,8,9,4) | F(10,11,12,1) C(1) | F(14,15) S(1,2*) C(2*) L(3) -X(1) -F(13) | +X(1) +F(13) |
| T(32) | F(2,3) L(1) (ALARM) (ALARM) | F(5,6) L(2) | F(7,8,9,4) | F(10,11,12,1) C(1) | F(14,15) S(1,2*) C(2*) L(3) | X(1) F(13) |

FIGURE 7G: TIME LINE OF FILE INVENTORY / PERSONNEL CONFIGURATIONS (CONTINUED)

| TIME | R1/L1 | R2/L2 | R3/L3 | FILE ROOM | SECRETARIAL AREA | EXIT |
|---|---|---|---|---|---|---|
| T(33) | F(2,3) L(1) | F(5,6) L(2) | F(7,8,9,4) | F(10,11,12,1) C(1) | F(14,15) S(1,2*) C(2*) -L(3) | +L(3) X(1) F(13) |
|  | (ALARM) (ALARM) | | | | | |
| T(34) | F(2,3) L(1) | F(5,6) L(2) | F(7,8,9,4) | F(10,11,12,1) C(1) | F(14,15) S(1,2*) C(2*) | L(3) X(1) F(13) |
|  | (ALARM) (ALARM) | | | | | |
| T(35) | F(2,3) L(1) | F(5,6) L(2) | F(7,8,9,4) | F(10,11,12,1) C(1) | F(14,15) S(1,2*) C(2*) +L(3) | -L(3) X(1) -F(13) |
|  | (ALARM) (ALARM) | | | | +F(13) | |
| T(36) | F(2,3) L(1) | F(5,6) L(2) | F(7,8,9,4) | F(10,11,12,1) C(1) | F(13,14,15) S(1,2*) C(2*) L(3) | |

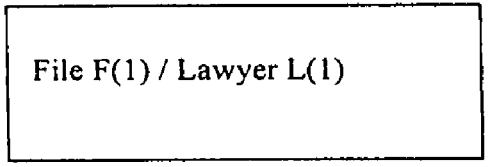
FIGURE 10a  611
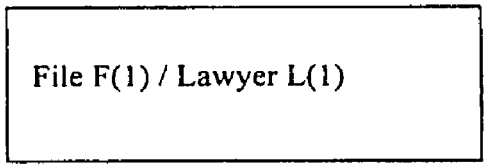
FIGURE 10b  641
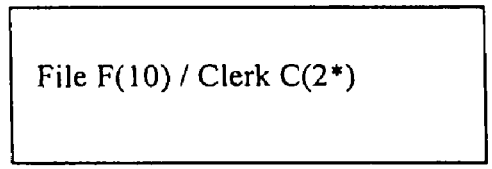
FIGURE 10c  641
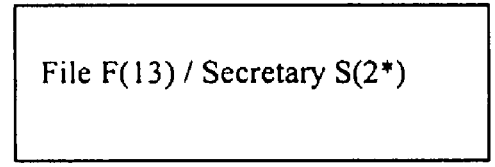
FIGURE 10d  651
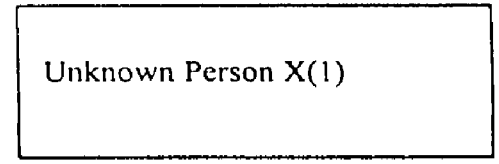
FIGURE 10e  651
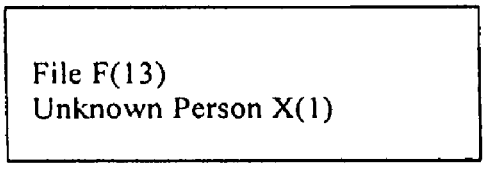
FIGURE 10f  651

REMOTE DYNAMIC INGRESS/EGRESS INVENTORY SECURITY SYSTEM

BACKGROUND OF THE INVENTION

The events of Sep. 11, 2001 heightened our awareness of security in public places, airports, ports and the workplace.

Also the passage of the HIPPA federal law has imposed severe restrictions on the accessibility and availability of patient medical records in hospitals and medical facilities.

This has increased the need for better controls over the possession and movement of records, files, inventory etc. by authorized personnel and unauthorized personnel.

Objects of the present invention are therefore to:

a. remotely detect the presence of articles or objects each belonging to one of a plurality of defined classes.

b. remotely detect the location of articles or objects each belonging to one of a plurality of defined classes.

c. remotely detect the identity of articles or objects each belonging to one of a plurality of defined classes.

d. create and store an inventory of articles or objects each belonging to one of a plurality of defined classes.

1. Field of the Invention

This invention relates to a Remote Dynamic Ingress/Egress Inventory Security System and in particular to such a system including dual modality remote sensing means.

2. Description of the Prior Art

The relevant prior art discloses several patents showing single and dual modality remote sensing systems. Such prior patents include:

U.S. Pat. No. 5,189,393 entitled "Dual technology motion sensor" and issued to Hu on Feb. 23, 2003 discloses a dual technology sensor which uses both ultrasonic and infrared sensors. The electronic circuit of the invention requires detection by both sensors to activate the load. Thus, false triggering will not occur unless the false triggering device both emits heat and moves. To avoid having the motion sensor inadvertently turn off while the person is still present, only one of the infrared and ultrasonic sensors is required to be detecting to maintain the activated state.

U.S. Pat. No. 5,406,256 entitled "Remote sensor and motion alarm system" issued to Ledel et al on Apr. 11, 1995 discloses a motion detector having a motion sensitive switch, timing circuit, encoder and radio-transmitting circuit in a housing which may be affixed to a remotely-positioned article; and a decoding and receiving circuit housed in a second housing. The radio-receiving circuit receives the encoded transmitted signal and couples it to a decoding circuit; the decoding circuit is connected to a latch circuit which drives an alarm. The sensitivity of the alarm generation circuits are controlled by a timing circuit, and the alarm may be disabled in order to enable the operator to evaluate the nature of the incoming signals.

U.S. Pat. No. 5,532,824 entitled "Optical motion sensor" and issued to Harvey et al on Jul. 02, 1996 discloses an apparatus which determines the position of an object with respect to a reference coordinate system. Preferably, the apparatus includes a target attached to the object, the target moves within a defined region and has a surface with a first pattern thereon. A projection device projects a second pattern upon the surface. A sensing device provides an image signal indicative of the target surface including the first pattern and the second pattern. An analyzer receives the image signal and determines the position of the object based on the position of images of the first pattern and the second pattern.

U.S. Pat. No. 6,044,952 entitled "Multi-function optical sensor for a document acceptor" and issued to Haggerty et al on Apr. 04, 2000 discloses a document acceptor including a document transport path and a multi-function optical sensor disposed adjacent the document path. The multi-function sensor can be operated in one of two or more modes. Depending on the mode in which the sensor is operated, signals from the sensor can be used, for example, to indicate whether a document has reached a particular position, to determine whether the document includes a predetermined pattern, such as a bar-code pattern, or to determine whether an attempt is being made to pull the document out of the acceptor.

U.S. Pat. No. 6,225,905 entitled "Sensor for remote detection of objects" and issued to Tyren et al on May 01, 2001 discloses a sensor for remote detection of objects in a surveillance zone is preferably intended to be used in an article surveillance zone, which further has at least one transmitter means and at least one receiver means for transmitting and receiving, respectively, electromagnetic radio-frequency signals in the surveillance zone, and at least one modulating means for generating a modulation field in the surveillance zone. The sensor is arranged to transmit an electromagnetic reply signal at the reception of electromagnetic energy from the transmitter means, said reply signal being dependent on the modulation field and being receivable by the receiver means. A magnetic element is arranged in a sensor body, the magnetic properties of the element being controllable by a magnetic field acting as the modulation field, wherein the amplitude of the reply signal from the sensor is controllable through the magnetic modulation field.

U.S. Pat. No. 6,417,771 entitled "Sensor, a method and a system for remote detection of objects" and issued to Tyren on Jul. 09, 2002 discloses a method for remote detection of objects, each object is provided with a sensor comprising at least two magnetic elements arranged in a predetermined mutual relationship representing an identity of the sensor. Electromagnetic signals are generated for exciting the sensor elements to produce electromagnetic reply signals. An amplitude of the electromagnetic reply signal from each sensor element is modulated by a first magnetic field having a magnitude-variant and a magnitude-invariant component. A second magnetic field is generated with rotating field vector. A frequency shift is detected in a component of the reply signal, when a magnitude-invariant component of the second magnetic field balances the magnitude-invariant component of the first magnetic field, wherein the respective sensor element is momentarily exposed to a resulting magnetic field with essentially no magnitude-invariant component. An orientation of the respective sensor element is determined from the orientation of the magnitude-invariant component of the second magnetic field, when the frequency shift occurs.

Upon a review of the above prior patents, it will be apparent to those skilled in the art that such patents do not disclose applicant's invention which includes dual modality sensing means to detect, locate, identify and inventory multiple classes of objects.

SUMMARY OF THE INVENTION

In a system for providing an inventory of a plurality of first class objects and a plurality of second class objects, such plurality of first class objects and such plurality of second class objects being distributed in a first defined location and in a second defined location; such first defined location and such second defined location being accessible to each other via a common connecting pathway; said system comprising:

motion sensing means for producing a detection signal when the presence or motion of an object being either a first class object or a second class object is detected while present or moving through such common connecting opening;

universal signal transmitting means being responsive to said detection signal when received from said motion sensing means for transmitting a universal signal;

unique identity signal detecting means for detecting the presence or absence of a unique identity signal from such detected object; each first class object and each second class object being capable of transmitting a unique identity signal in response to said universal signal;

information storage means being responsive to said unique identity signal detecting means and being capable of storing information corresponding to the presence or absence of a unique identity signal from such detected object.

A method for providing an inventory of a plurality of first class objects and a plurality of second class objects, such plurality of first class objects and such plurality of second class objects being distributed in a first defined location and in a second defined location; such first defined location and such second defined location being accessible to each other via a common connecting pathway; said method comprising the steps of:

detecting the presence or motion of an object being either a first class object or a second class object while present or moving through such common connecting opening and producing a detection signal in response thereto;

transmitting a universal low-power signal in response to said detection signal;

detecting the presence or absence of a unique identity signal from such detected object; each first class object and each second class object being capable of transmitting a unique identity signal in response to said universal signal; and storing information corresponding to the presence or absence of a unique identity signal from such detected object.

Features of the present invention are that:

a. it comprises general motion sensing means for remotely detecting the presence and location of articles or objects each belonging to one of a plurality of defined classes.

b. it comprises specific sensing means for remotely detecting the unique identity of articles or objects each belonging to one of a plurality of defined classes and to create and store an inventory of such articles or objects.

c. one class of such objects may be authorized or un-authorized personnel with identity tags.

d. one class of such objects may be un-authorized strangers or trespassers.

e. the various detection/location scenarios according to the present invention are as follows:

1. a motion sensing means at a given pathway or entranceway detects and locates the motion or presence of either a first class object or a second class object or both; the unique/identity signal receiving means associated with such pathway or entranceway receives identity signals respectively corresponding to a first class object and to an authorized second class object; the CPU stores the identity information corresponding to such first class object and to such authorized second class object; this is an acceptable scenario and the alarm means and the display means are not activated by the CPU; for illustrative purposes only this corresponds to a file being in the possession of a lawyer and being detected and located.

2. a motion sensing means at a given pathway or entranceway detects and locates the motion or presence of either a first class object or a second class object; the unique/identity signal receiving means associated with such pathway or entranceway receives an identity signal corresponding to an authorized second class object; the CPU stores the identity information corresponding to such authorized second class object; this is an acceptable scenario and the alarm means and the display means are not activated by the CPU; for illustrative purposes only this corresponds to a lawyer being detected and located.

3. a motion sensing means at a given pathway or entranceway detects and locates the motion or presence of either a first class object or a second class object or both; the unique/identity signal receiving means associated with such pathway or entranceway receives identity signals respectively corresponding to a first class object and to an un-authorized second class object; the CPU stores the identity information corresponding to such first class object and to such un-authorized second class object; this is an un-acceptable scenario and the alarm means and the display means are activated by the CPU; for illustrative purposes only this corresponds to a file being in the possession of an un-authorized clerk and being detected and located.

4. a motion sensing means at a given pathway or entranceway detects and locates the motion or presence of either a first class object or a second class object or both; the unique/identity signal receiving means associated with such pathway or entranceway receives an identity signal corresponding only to a first class object; the CPU stores the identity information corresponding to such first class object; this is an un-acceptable scenario and the alarm means and the display means are activated by the CPU; for illustrative purposes only this corresponds to a file being in the possession of a stranger/trespasser and being detected and located.

5. a motion sensing means at a given pathway or entranceway detects and locates the motion or presence of either a first class object or a second class object or both; the unique/identity signal receiving means associated with such pathway or entranceway receives an identity signal corresponding to an un-authorized second class object; the CPU stores the identity information corresponding to such un-authorized second class object; this is an un-acceptable scenario and the alarm means and the display means are activated by the CPU; for illustrative purposes only this corresponds to an un-authorized clerk being detected and located in an un-authorized room or area.

6. a motion sensing means at a given pathway or entranceway detects and locates the motion or presence of either a first class object or a second class object or both; the unique/identity signal receiving means associated with such pathway or entranceway does not receive an identity signal corresponding to either a first class object or to a second class object; the CPU stores the identity of the pathway or entranceway relating to this event; this is an un-acceptable scenario and the alarm means and the display means are activated by the CPU; for illustrative purposes only this corresponds to a stranger/trespasser being detected and located.

Advantages of the present invention are that:

a. it may allow for the remote detection and location of articles, objects and personnel.

b. it may allow for the remote inventory of articles, objects and personnel.

c. it may allow for upgraded security relating to the remote detection and location of authorized and un-authorized personnel.

d. it may allow for upgraded security relating to the remote detection of the possession and removal of articles or objects by authorized and un-authorized personnel.

BRIEF DESCRIPTION OF THE DRAWINGS

The above and other objects, advantages and features of the present invention will be further appreciated from a reading of the following detailed description in conjunction with the drawing in which:

FIGS. 7A-7G are time-line tables showing the detection, identity and inventory of various first class objects, second class objects, and third class objects according to the present invention.

FIG. 10a shows a first detection configuration. FIG. 10b shows a second detection configuration. FIG. 10c shows a third detection configuration. FIG. 10d shows a fourth detection configuration. FIG. 10e shows a fifth detection configuration. FIG. 10f shows a sixth detection configuration.

DETAILED DESCRIPTION OF THE INVENTION

Figure 1:
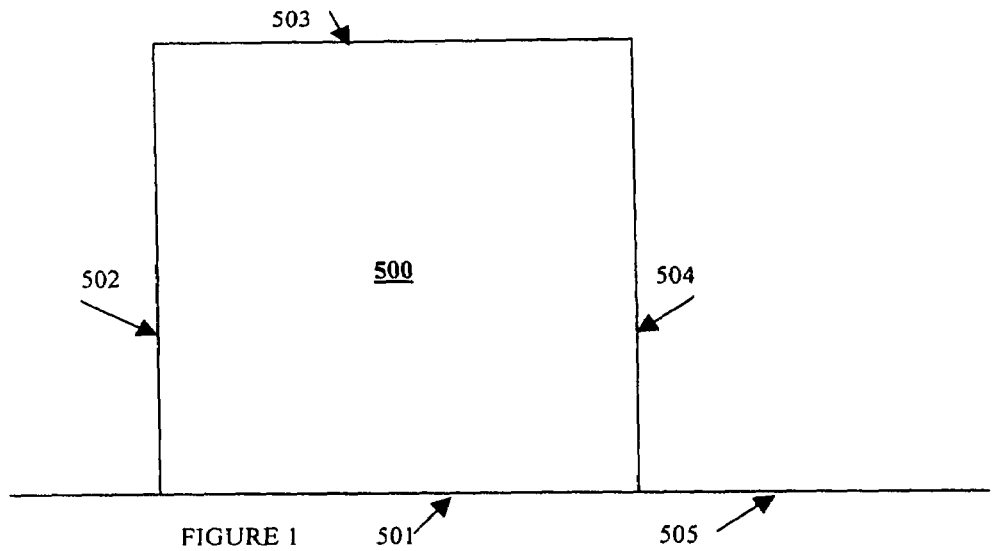
FIG. 1 is a front view of a pathway or entranceway which is to be modified to accommodate the present invention.

FIG. 1 is a front view of pathway or entranceway 500 which is to be modified to accommodate the present invention. FIG. 1 shows pathway or entranceway 500 including opening 501, left lateral vertical frame 502, upper horizontal frame 503, right lateral vertical frame 504, and floor 505. Pathway or entranceway 500 has a width W and a height H.

Figure 2:
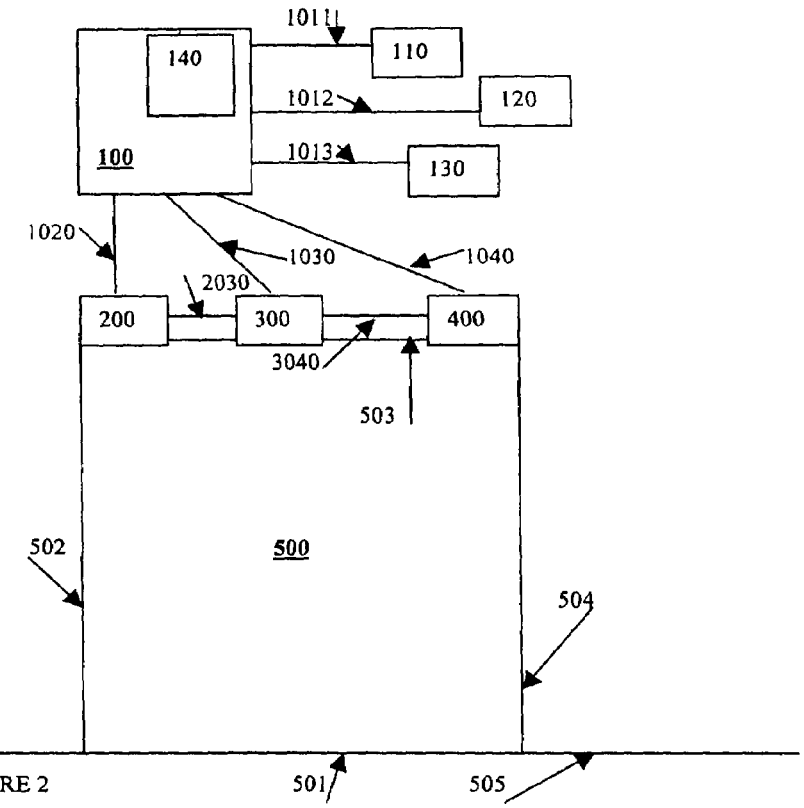
FIG. 2 is a front view of a pathway or entranceway as modified to accommodate the present invention.

FIG. 2 is a front view of pathway or entranceway 500 as modified to accommodate the present invention. FIG. 2 shows pathway or entranceway 500 including opening 501, left lateral vertical frame 502, upper horizontal frame 503, right lateral vertical frame 504, and floor 505. Pathway or entranceway 500 has a width W and a height H. FIG. 2 also shows Remote Dynamic Ingress/Egress Inventory Security System 10 comprising CPU 100, printer 110, display 120, alarm 130, motion sensor 200, universal signal transmitter 300, and unique identity signal receiver 400. CPU 100 further comprises data storage means 140. Signal transmitting means 1011 may allow CPU 100 and printer 110 to send signals to each other and to receive signals from each other. Signal transmitting means 1012 may allow CPU 100 and display 120 to send signals to each other and to receive signals from each other. Signal transmitting means 1013 may allow CPU 100 and alarm 130 to send signals to each other and to receive signals from each other. Signal transmitting means 1020 may allow CPU 100 and motion sensor 200 to send signals to each other and to receive signals from each other. Signal transmitting means 1030 may allow CPU 100 and universal signal transmitter 300 to send signals to each other and to receive signals from each other. Signal transmitting means 1040 may allow CPU 100 and unique identity signal receiver 400 to send signals to each other and to receive signals from each other. Signal transmitting means 2030 may allow motion sensor 200 and universal signal transmitter 300 to send signals to each other and to receive signals from each other. Signal transmitting means 3040 may allow universal signal transmitter 300 and unique identity signal receiver 400 to send signals to each other and to receive signals from each other. Each aforementioned signal transmitting means may be wired or wireless.

According to the embodiment of FIG. 2 the height H of pathway or entranceway 500 is less than its width W.

According to the embodiment of FIG. 2, the occupied space or volume of the motion sensing signal that emanates from motion sensor 200 may be confined to and defined by such motion sensor above and by the lesser depth of left lateral vertical frame 502 or right lateral vertical frame 504 along opening 501 below. According to the embodiment of FIG. 2, the occupied space or volume of the universal signal that emanates from universal signal transmitter 300 may be confined to and defined by such universal common signal transmitter above and by the lesser depth of left lateral vertical frame 502 or right lateral vertical frame 504 along opening 501 below. According to the embodiment of FIG. 2, the occupied space or volume of the unique identity signal being receivable by unique identity signal receiver 400 may be confined to and defined by such unique identity signal receiver above and by the lesser depth of left lateral vertical frame 502 or right lateral vertical frame 504 along opening 501 below.

According to the embodiment of FIG. 2, signal transmitting means 3040 may allow universal signal transmitter 300 and unique identity signal receiver 400 to send signals to each other and to receive signals from each other. Unique identity signal receiver 400 may send a first signal to universal signal transmitter 300 to temporarily stop transmitting its universal low-power signal during the time that unique identity signal receiver 400 is receiving a unique identity signal from a detected object. Unique identity signal receiver 400 may then send a second signal to universal signal transmitter 300 to continue transmitting its universal low-power signal after the time that unique identity signal receiver 400 received said unique identity signal from such detected object.

According to the embodiment of FIG. 2, signal transmitting means 1030 may allow CPU 100 and universal signal transmitter 300 to send signals to each other and to receive signals from each other. CPU 100 may send a first signal to universal signal transmitter 300 to temporarily stop transmitting its universal low-power signal during the time that unique identity signal receiver 400 is receiving a unique identity signal from a detected object. CPU 100 may then send a second signal to universal signal transmitter 300 to continue transmitting its universal low-power signal after the time that unique identity signal receiver 400 received said unique identity signal from such detected object.

Figure 2A:
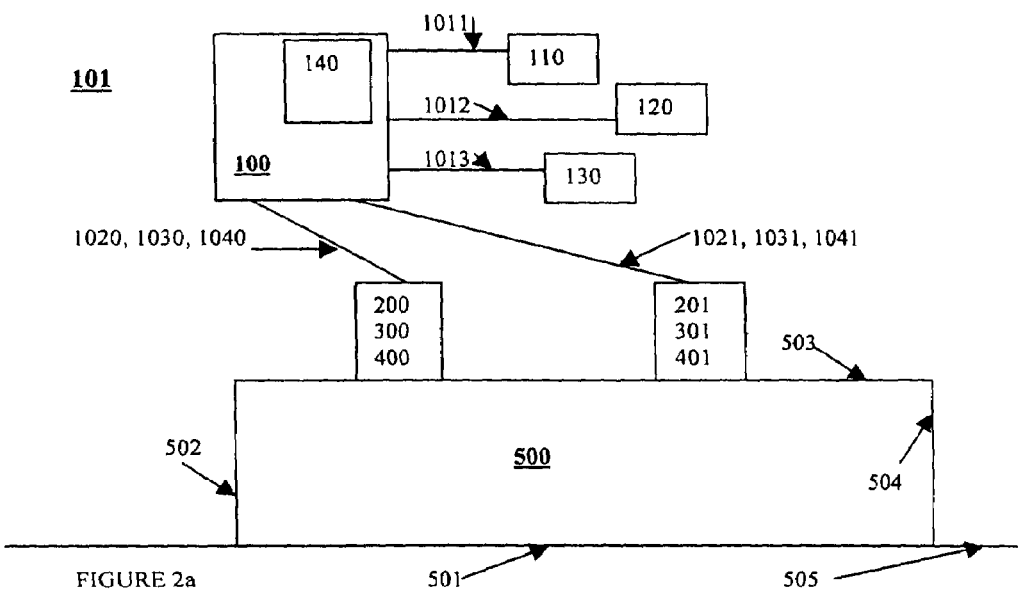
FIG. 2a is another front view of a pathway or entranceway as modified to accommodate the present invention.

FIG. 2a is another front view of a pathway or entranceway 500 as modified to accommodate the present invention. According to the embodiment of FIG. 2a the height H of pathway or entranceway 500 is much less than its width W. FIG. 2a shows pathway or entranceway 500 including opening 501, left lateral vertical frame 502, upper horizontal frame 503, right lateral vertical frame 504, and floor 505. Pathway or entranceway 500 has a width W and a height H. FIG. 2a also shows Remote Dynamic Ingress/Egress Inventory Security System 101 comprising CPU 100, printer 110, display 120, alarm 130, motion sensors 200-201, universal signal transmitters 300-301, and unique identity signal receivers 400-401. CPU 100 further comprises data storage means 140. Signal transmitting means 1011 may allow CPU 100 and printer 110 to send signals to each other and to receive signals from each other. Signal transmitting means 1012 may allow CPU 100 and display 120 to send signals to each other and to receive signals from each other. Signal transmitting means 1013 may allow CPU 100 and alarm 130 to send signals to each other and to receive signals from each other. Signal transmitting means 1020-1030-1040 may allow CPU 100 and elements 200-300-400 to send signals to each other and to receive signals from each other. Signal transmitting means 1021-1031-1041 may allow CPU 100 and elements 201-301-401 to send signals to each other and to receive signals from each other. Further signal transmitting means may allow elements 200 and 300 to send signals to each other and to receive signals from each other. Further signal transmitting means may allow elements 201 and 301 to send signals to each other and to receive signals from each other. Further signal transmitting means may allow elements 300 and 400 to send signals to each other and to receive signals from each other. Further signal transmitting means may allow elements 301 and 401 to send signals to each other and to receive signals from each other. Each aforementioned signal transmitting means may be wired or wireless.

According to the embodiment of FIG. 2a, motion sensing means 200-201 are uniformly linearly distributed along upper horizontal frame 503 for producing at least one detection signal when the presence or motion of an object is detected by one or more motion sensing means as such object is present or moves through opening 501. Universal common low-power signal transmitting means 300-301 are uniformly linearly distributed along upper horizontal frame 503. Each particular universal common low-power signal transmitting means is associated with only one particular motion sensing means. Each particular universal common low-power signal transmitting means is placed in physical proximity to its particular motion sensing means. At least one particular universal common low-power signal transmitting means is responsive to the detection signal received from its associated particular motion sensing means for transmitting a universal common low-power signal. Unique identity signal receiving means 400-401 are uniformly linearly distributed along upper horizontal frame 503. Each particular unique identity signal receiving means is associated with only one particular motion sensing means and with only one particular universal common low-power signal transmitting means. Each particular unique identity signal receiving means is placed in physical proximity to its particular motion sensing means and to its particular universal common low-power signal transmitting means. At least one particular unique identity signal receiving means is responsive to the unique identity signal from the detected object unique identity signal transmitting means as will be hereinafter described. Information storage means 140 is responsive to each particular unique identity signal receiving means for storing information corresponding to the identity of such detected object, the time when such object was detected, and the identity of such opening.

According to the embodiment of FIG. 2a, the occupied space or volume of the motion sensing signals that emanate from motion sensors 200-201 may be respectively confined to and defined by such motion sensors above and by the lesser depth of left lateral vertical frame 502 or right lateral vertical frame 504 along opening 501 below. According to the embodiment of FIG. 2a, the occupied space or volume of the universal signals that emanate from universal signal transmitters 300-301 may be respectively confined to and defined by such universal common signal transmitters above and by the lesser depth of left lateral vertical frame 502 or right lateral vertical frame 504 along opening 501 below. According to the embodiment of FIG. 2a, the occupied space or volume of the unique identity signals being receivable by unique identity signal receiver 400-401 may be respectively confined to and defined by such unique identity signal receivers above and by the lesser depth of left lateral vertical frame 502 or right lateral vertical frame 504 along opening 501 below.

According to the embodiment of FIG. 2a, internal signal transmitting means may allow universal signal transmitters 300-301 and their respective unique identity signal receiver 400-401 to send signals to each other and to receive signals from each other. Unique identity signal receivers 400-401 may send a first signal to their respective universal signal transmitters 300-301 to temporarily stop transmitting its universal low-power signal during the time that their unique identity signal receivers 400-401 are receiving a unique identity signal from a detected object. Unique identity signal receivers 400-401 may then send a second signal to their respective universal signal transmitters 300-301 to continue transmitting its universal low-power signal after their respective unique identity signal receivers 400-401 received a unique identity signal from such detected object.

According to the embodiment of FIG. 2a, signal transmitting means 1030-1031 may allow CPU 100 and universal signal transmitters 300-301 to respectively send signals to each other and to receive signals from each other. CPU 100 may send a first signal to universal signal transmitters 300-301 to temporarily stop transmitting its universal low-power signal during the time that their respective unique identity signal receivers 400-401 are receiving a unique identity signal from a detected object. CPU 100 may then send a second signal to universal signal transmitters 300-301 to continue transmitting its universal low-power signal after the time that their respective unique identity signal receivers 400-401 received a unique identity signal from such detected object.

Figure 3:
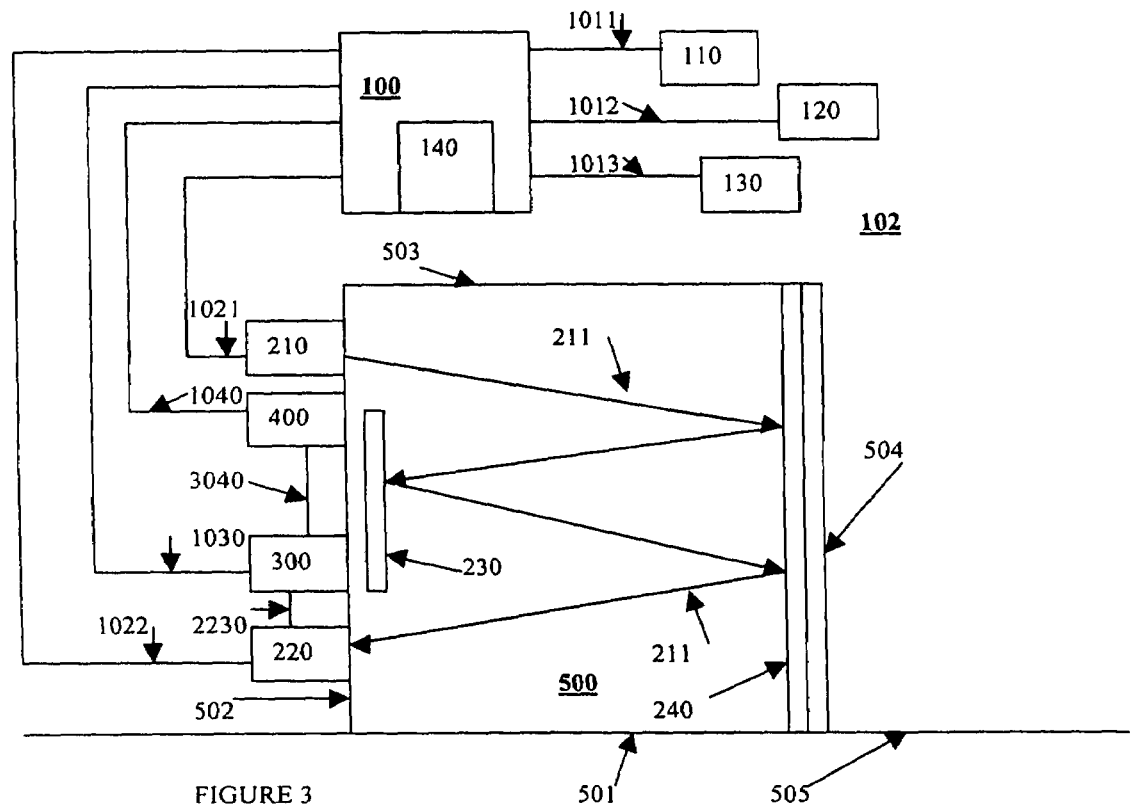
FIG. 3 is a front view of a pathway or entranceway further modified to accommodate the present invention.

FIG. 3 is a front view of pathway or entranceway 500 as further modified to accommodate the present invention. FIG. 3 shows pathway or entranceway 500 including opening 501, left lateral vertical frame 502, upper horizontal frame 503, right lateral vertical frame 504, and floor 505. FIG. 3 also shows Remote Dynamic Ingress/Egress Inventory Security System 102 comprising CPU 100, printer 110, display 120, alarm 130, a motion sensor, universal signal transmitter 300, and unique identity signal receiver 400. CPU 100 further comprises data storage means 140. Signal transmitting means 1011 may allow CPU 100 and printer 110 to send signals to each other and to receive signals from each other. Signal transmitting means 1012 may allow CPU 100 and display 120 to send signals to each other and to receive signals from each other. Signal transmitting means 1013 may allow CPU 100 and alarm 130 to send signals to each other and to receive signals from each other. Signal transmitting means 1030 may allow CPU 100 and universal signal transmitter 300 to send signals to each other and to receive signals from each other. Signal transmitting means 1040 may allow CPU 100 and unique identity signal receiver 400 to send signals to each other and to receive signals from each other. Signal transmitting means 3040 may allow universal signal transmitter 300 and unique identity signal receiver 400 to send signals to each other and to receive signals from each other. Each aforementioned signal transmitting means may be wired or wireless.

According to the embodiment of FIG. 3 the height H of pathway or entranceway 500 is greater than its width W.

In the embodiment of FIG. 3, the motion sensor is an optical motion sensor further comprising optical light beam generating means 210 being located on left lateral vertical frame 502; optical light beam receiving means 220 being located on left lateral frame 502; vertical light beam reflective strip 230 being located on left lateral vertical frame 502; and vertical light beam reflective strip 240 being located on right lateral vertical frame 504. The aforementioned elements are positioned such that light beam 211 emanates from optical light beam generating means 210, may reflect off vertical light beam reflective strip 240 and may reflect off vertical light beam reflective strip 230 until light beam 211 reaches optical light beam receiving means 220. Signal transmitting means 1022 may allow CPU 100 and optical light beam receiving means 220 to send signals to each other and to receive signals from each other. Signal transmitting means 2230 may allow optical light beam receiving means 220 and universal signal transmitter 300 to send signals to each other and to receive signals from each other. Signal transmitting means 1021 may allow CPU 100 and optical light beam generating means 210 to send signals to each other and to receive signals from each other. Each aforementioned signal transmitting means may be wired or wireless.

According to the embodiment of FIG. 3, the occupied space or volume of the optical light beam that emanates from optical light beam generating means 210 may be confined to and defined by the such optical light beam generating means on the left and by the area of vertical light beam reflective strip 240 on the right. According to the embodiment of FIG. 3, the occupied space or volume of the universal signal that emanates from universal signal transmitter 300 may be confined to and defined by such universal signal transmitter on the left and by the area of vertical light beam reflective strip 240 on the right. According to the embodiment of FIG. 3, the occupied space or volume of the unique identity signal being receivable by unique identity signal receiver 400 may be confined to and defined by such unique identity signal receiver on the left and by the area vertical light beam reflective strip 240 on the right.

According to the embodiment of FIG. 3, signal transmitting means 3040 may allow universal signal transmitter 300 and unique identity signal receiver 400 to send signals to each other and to receive signals from each other. Unique identity signal receiver 400 may send a first signal to universal signal transmitter 300 to temporarily stop transmitting its universal low-power signal during the time that unique identity signal receiver 400 is receiving a unique identity signal from a detected object. Unique identity signal receiver 400 may then send a second signal to universal signal transmitter 300 to continue transmitting its universal low-power signal after unique identity signal receiver 400 received a unique identity signal from such detected object.

According to the embodiment of FIG. 3, signal transmitting means 1030 may allow CPU 100 and universal signal transmitter 300 to send signals to each other and to receive signals from each other. CPU 100 may send a first signal to universal signal transmitter 300 to temporarily stop transmitting its universal low-power signal during the time that unique identity signal receiver 400 is receiving a unique identity signal from a detected object. CPU 100 may then send a second signal to universal signal transmitter 300 to continue transmitting its universal low-power signal after unique identity signal receiver 400 received a unique identity signal from such detected object.

Figure 4:
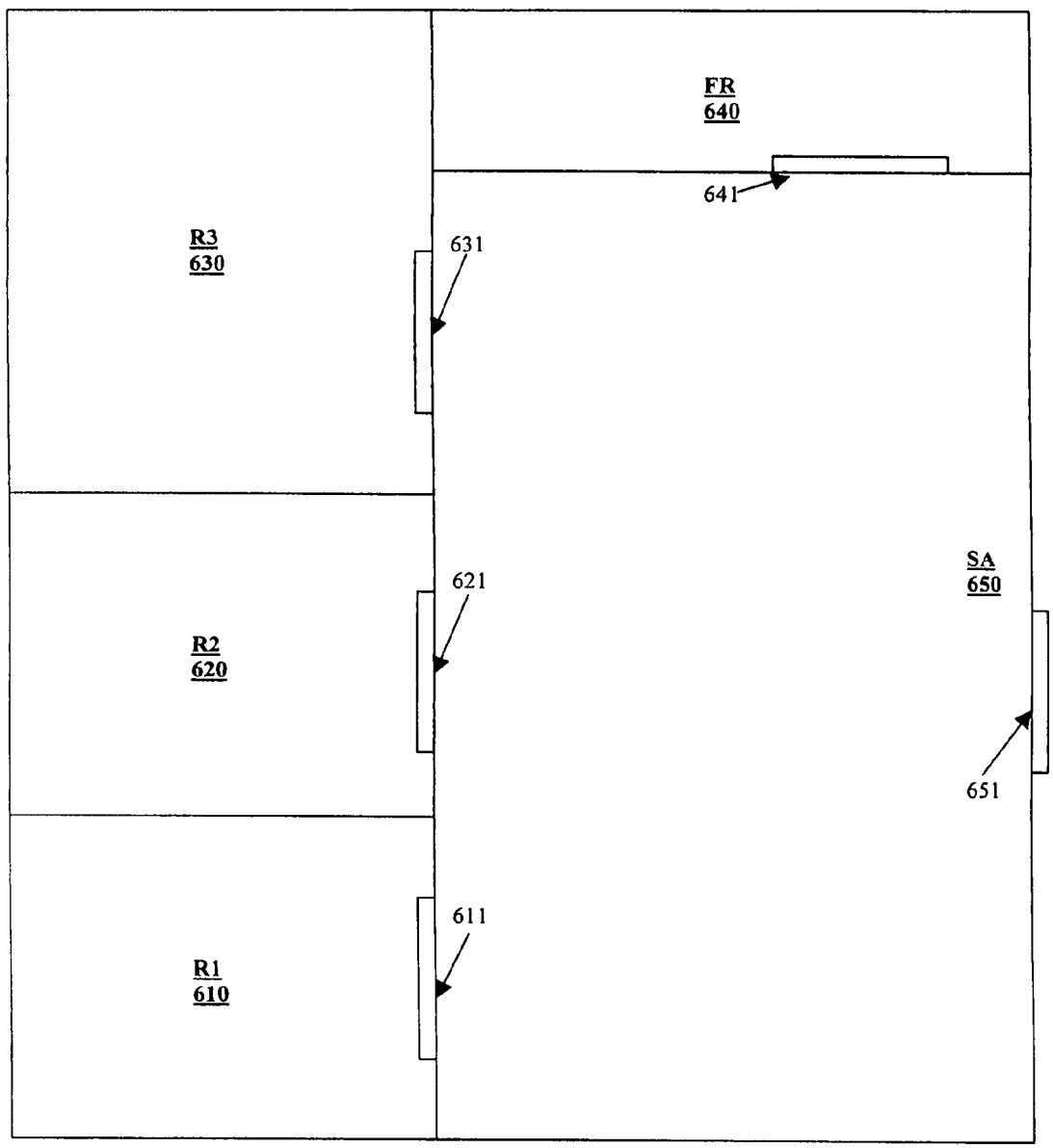
FIG. 4 is a top view showing the room layout of the office which is to be modified to accommodate the present invention.

FIG. 4 is a top view showing location 600 which is to be modified to accommodate the present invention. For illustrative purposes only location 600 is a law office comprising: room 610 or R1 with pathway or entranceway 611; room 620 or R2 with pathway or entranceway 621; room 630 or R3 with pathway or entranceway 631; file room 640 or FR with pathway or entranceway 641; and secretarial area 650 or SA with pathway or entranceway 651. Each aforementioned pathway or entranceway may serve as an entrance or an exit to and from their respective adjoining rooms or areas. Each pathway or entranceway has its own width W(i) and its own height H(i).

Figure 5A:
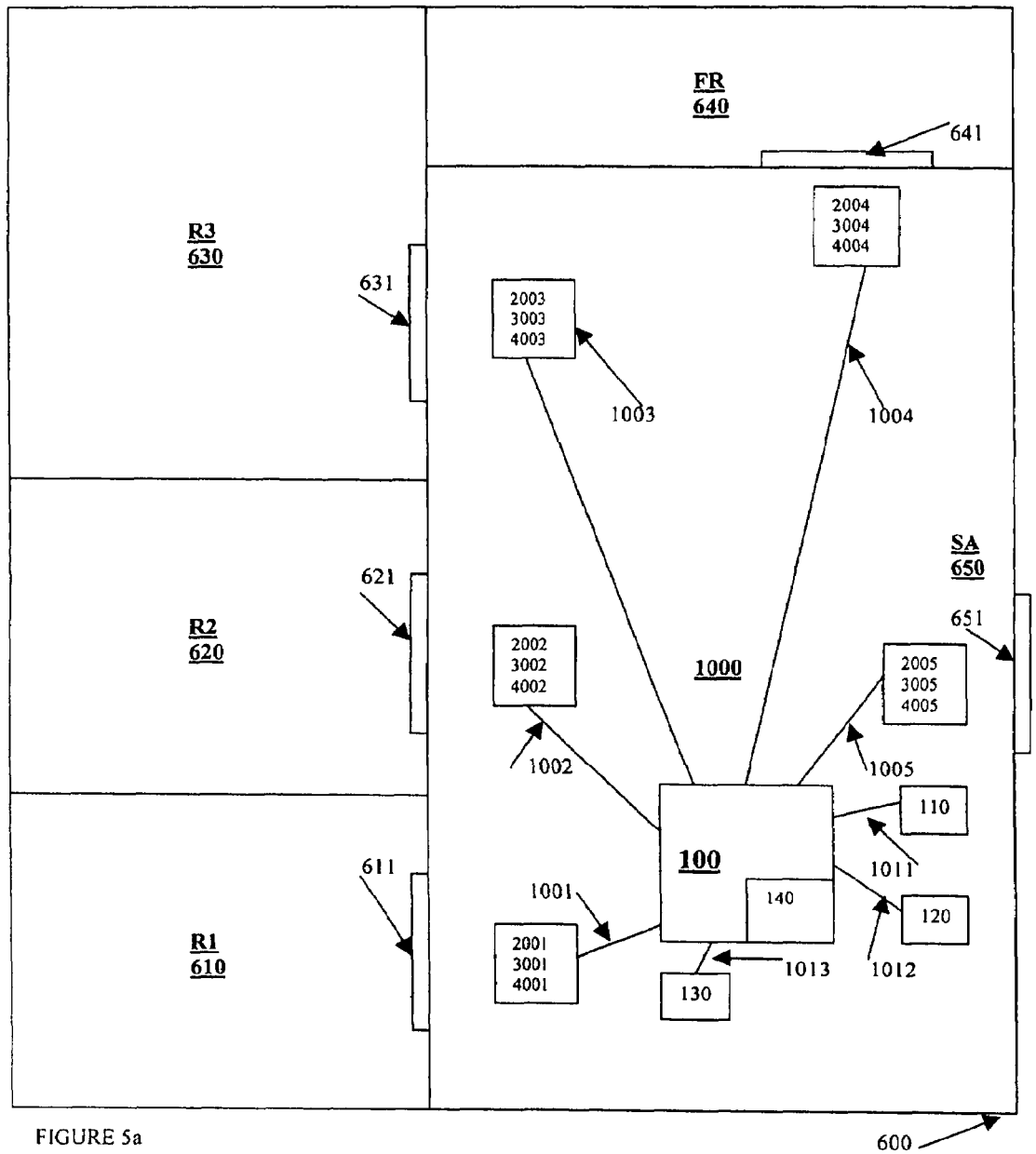
FIG. 5a is a top view showing the room layout of the office as modified to accommodate the present invention.

FIG. 5a is a top view showing location 600 as modified to accommodate the present invention. FIG. 5a shows law office 600 comprising: room 610 or R1 with pathway or entranceway 611; room 620 or R2 with pathway or entranceway 621; room 630 or R3 with pathway or entranceway 631; file room 640 or FR with pathway or entranceway 641; and secretarial area 650 or SA with pathway or entranceway 651. In this multi-room/multi-pathway or entranceway embodiment, FIG. 5a also shows Remote Dynamic Ingress/Egress Inventory Security System 1000 comprising CPU 100; printer 110; display 120; alarm 130; motion sensors 2001, 2002, 2003, 2004 and 2005; universal signal transmitters 3001, 3002, 3003, 3004 and 3005; and unique identity signal receivers 4001, 4002, 4003, 4004 and 4005. Each pathway or entranceway has its own width W(i) and its own height H(i).

Motion sensor 2001; universal signal transmitter 3001; and unique identity signal receiver 4001 being all located at pathway or entranceway 611 may send signals to each other and may receive signals from each other via respective signal transmitting means as already shown in and explained with respect to FIGS. 2 and 3. Motion sensor 2002; universal signal transmitter 3002; and unique identity signal receiver 4002 being all located at pathway or entranceway 621 may send signals to each other and may receive signals from each other via respective signal transmitting means as already shown in and explained with respect to FIGS. 2 and 3. Motion sensor 2003; universal signal transmitter 3003; and unique identity signal receiver 4003 being all located at pathway or entranceway 631 may send signals to each other and may receive signals from each other via respective signal transmitting means as already shown in and explained with respect to FIGS. 2 and 3. Motion sensor 2004; universal signal transmitter 3004; and unique identity signal receiver 4004 being all located at pathway or entranceway 641 may send signals to each other and may receive signals from each other via respective signal transmitting means as already shown in and explained with respect to FIGS. 2 and 3. Motion sensor 2005; universal signal transmitter 3005; and unique identity signal receiver 4005 being all located at pathway or entranceway 651 may send signals to each other and may receive signals from each other via respective signal transmitting means as already shown in and explained with respect to FIGS. 2 and 3. Again CPU 100 further comprises data storage means 140 as in FIGS. 2 and 3. Signal transmitting means 1011 may allow CPU 100 and printer 110 to send signals to each other and to receive signals from each other. Signal transmitting means 1012 may allow CPU 100 and display 120 to send signals to each other and to receive signals from each other. Signal transmitting means 1013 may allow CPU 100 and alarm 130 to send signals to each other and to receive signals from each other. Each aforementioned signal transmitting means may be wired or wireless.

Signal transmitting means 1001 may allow CPU 100 and the combination comprising motion sensor 2001, universal signal transmitter 3001 and unique identity signal receiver 4001 to send signals to each other and to receive signals from each other. Signal transmitting means 1002 may allow CPU 100 and the combination comprising motion sensor 2002, universal signal transmitter 3002 and unique identity signal receiver 4002 to send signals to each other and to receive signals from each other. Signal transmitting means 1003 may allow CPU 100 and the combination comprising motion sensor 2003, universal signal transmitter 3003 and unique identity signal receiver 4003 to send signals to each other and to receive signals from each other. Signal transmitting means 1004 may allow CPU 100 and the combination comprising motion sensor 2004, universal signal transmitter 3004 and unique identity signal receiver 4004 to send signals to each other and to receive signals from each other. Signal transmitting means 1005 may allow CPU 100 and the combination comprising motion sensor 2005, universal signal transmitter 3005 and unique identity signal receiver 4005 to send signals to each other and to receive signals from each other. Each aforementioned signal transmitting means may be wired or wireless.

According to the embodiment of FIG. 5*a*, the occupied space or volume of the motion sensing signal that emanates from each motion sensor may be confined to and defined by each motion sensor and by the depth of its respective entranceway. According to the embodiment of FIG. 5*a*, the occupied space or volume of the universal signal that emanates from each universal signal transmitter may be confined to and defined by each universal common signal transmitter and by the depth of its respective entranceway. According to the embodiment of FIG. 5*a*, the occupied space or volume of the unique identity signal being receivable by each unique identity signal receiver may be confined to and defined by each unique identity signal receiver and by the depth of its respective entranceway.

Figure 5B:
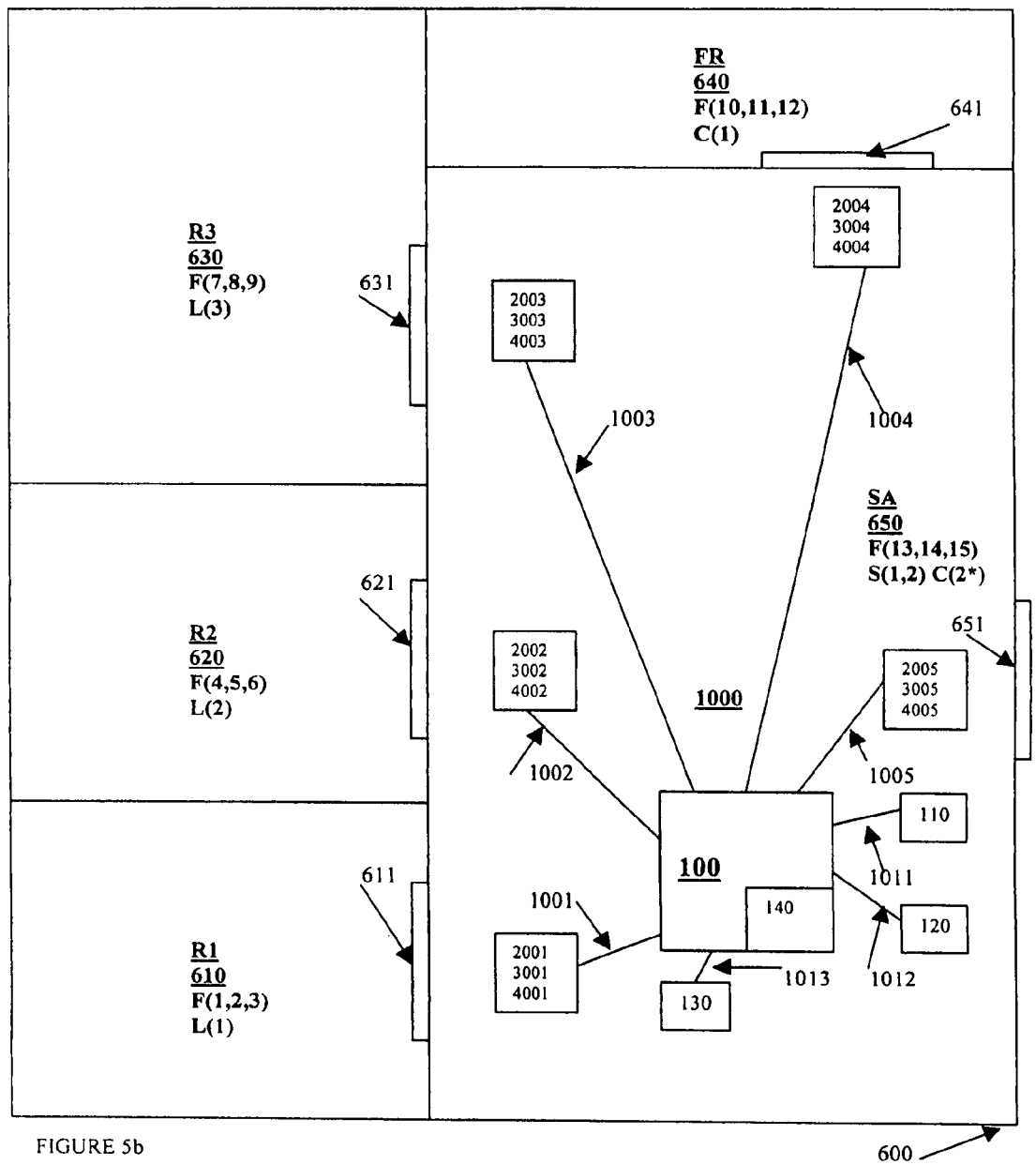
FIG. 5b is a top view showing the room layout of the office as modified to accommodate the present invention and showing the initial inventory and locations of the file sets and the authorized and un-authorized personnel sets.

FIG. 5*b* shows the initial physical placement or inventory of the first class objects being located in this multi-room/multi-pathway or entranceway embodiment of Remote Dynamic Ingress/Egress Inventory Security System 1000. FIG. 5*b* shows first class objects comprising file set F(1,2,3) being located in Room R1; file set F(4,5,6) being located in Room R2; file set F(7,8,9) being located in Room R3; file set F(10,11,12) being located in the File Room; and file set F(13,14,15) being located in the Secretarial Area. Generally such sets of first class objects may be legal files, medical records, envelopes, boxes, tools, supplies, etc. In this particular case for illustrative purposes only such sets of first class objects are legal files.

FIG. 5*b* also shows the initial physical placements or inventory of the second class objects as located in this multi-room/multi-pathway or entranceway embodiment of Remote Dynamic Ingress/Egress Inventory Security System 1000. The second class objects comprise personnel set L(1) located in Room R1; personnel set L(2) located in Room R2; personnel set L(3) located in Room R3; personnel set C(1) located in the File Room; and personnel sets S(1,2) and C(2*) located in the Secretarial Area. Such personnel sets may be legal personnel, medical personnel, etc. In this particular case for illustrative purposes only such personnel are lawyers L, clerks C, and secretaries S. An asterisk next to a member of personnel means that such member of personnel has certain restrictions as to the possession or transporting of first class objects and as to the locations or rooms which such person may enter or be located in. An asterisk next to a member of personnel means that such member is un-authorized as to certain situations.

Figure 6A:
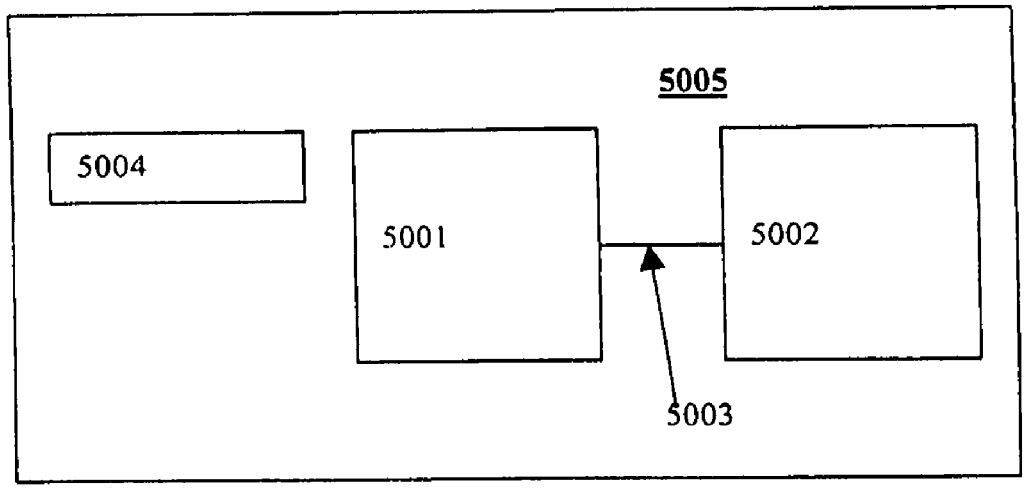
FIG. 6a shows a first class object tag or label according to the present invention.

FIG. 6*a* shows the tag or label 5005 placed on or embedded in a typical first class object. Tag or label 5005 comprises: universal signal receiver 5001 which responds to a signal transmitted by an appropriately located universal signal transmitter; unique identity signal transmitter 5002 whose signal is to be received by an appropriately located unique identity signal receiver; signal transmitting means 5003 which may allow universal signal receiver 5001 and unique identity signal transmitter 5002 to send signals to each other and to receive signals from each other; and identity coding means 5004 which may be a magnetic strip, a bar code or any other scan-able coding means containing a code corresponding to the identity of its associated first class object. The aforementioned description and explanation applies to all first class objects shown in FIG. 5*b*.

Figure 6B:
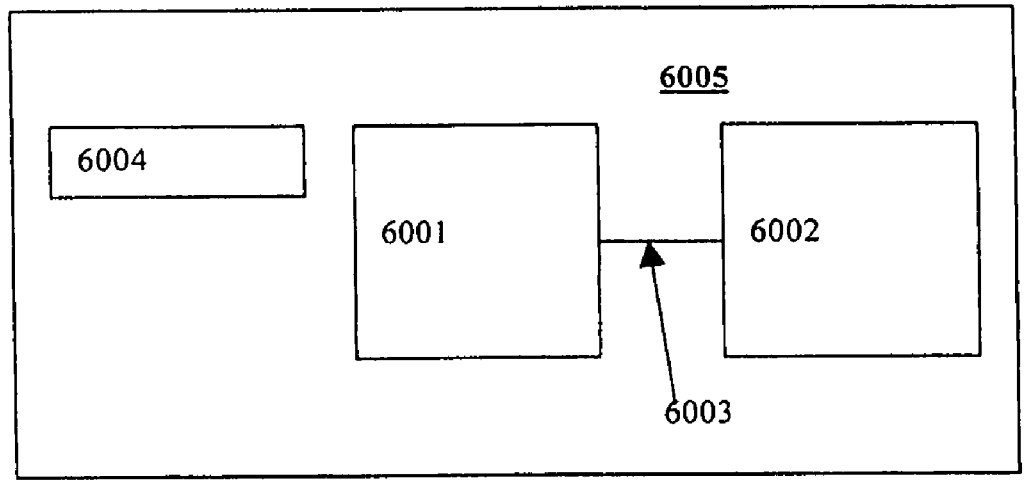
FIG. 6b shows a second class object tag or label according to the present invention.

FIG. 6*b* shows the tag or label 6005 carried or worn by a typical second class object. Tag or label 6005 comprises: universal signal receiver 6001 which responds to a signal transmitted by an appropriately located universal signal transmitter; unique identity signal transmitter 6002 whose signal is to be received by an appropriately located unique identity signal receiver; signal transmitting means 6003 which may allow universal signal receiver 6001 and unique identity signal transmitter 6002 to send signals to each other and to receive signals from each other; and identity coding means 6004 which may be a magnetic strip, a bar code or any other scan-able coding means containing a code corresponding to the identity of its associated first class object. The aforementioned description and explanation applies to all second class objects shown in FIG. 5*b*.

According to the present invention, each universal signal transmitter is preferably a low-power transmitter. Each unique identity signal transmitter is preferably a low-power transmitter.

According to the present invention, each universal signal transmitter preferably transmits its low-power signal at less than or equal to 75 milliwatts. Each unique identity signal transmitter preferably transmits its low-power signal at less than or equal to 75 milliwatts.

According to the present invention, each universal signal transmitter may be a radio frequency identification (RFID) transmitter. Each unique identity signal transmitter may be a radio frequency identification (RFID) transmitter. Each universal signal receiver may be a radio frequency identification (RFID) receiver. Each unique identity signal receiver may be a radio frequency identification (RFID) receiver.

According to the present invention, each universal signal transmitter preferably transmits its low-power signal for less than one second and more preferably for less than ½ second. Each unique identity signal transmitter preferably transmits its low-power signal for less than ½ second and more preferably for less than ¼ second. In effect each unique identity signal transmitter preferably transmits its low-power signal for less than ½ the time period that its associated universal signal transmitter transmits its low-power signal. This would accommodate for the reception by a unique identity signal receiver of more than one unique identity signal from more than one associated unique identity signal transmitter corresponding to one first class object plus one second class object. This would also accommodate for the reception by a unique identity signal receiver of more than one unique identity signal from more than one associated unique identity signal transmitter corresponding to more that one first class object plus one second class object. This would further accommodate for the reception by a unique identity signal receiver of more than one unique identity signal from more than one associated unique identity signal transmitter corresponding to one first class object plus more than one second class object.

According to the present invention, when the horizontal width W of the pathway or entranceway is less than its vertical height H then the configurations shown in FIG. 3 and may be preferable. In this case the universal signal transmitter and the unique identity signal receiver would be placed along the lateral vertical frame. This would accommodate the range of the low-power universal signal transmitter and the low-power unique identity signal transmitter. It may be preferable to place the low-power universal signal transmitter and the unique identity signal receiver in the lower half of the lateral vertical frame. This may accommodate the vertical location of the first class object as it passes through the pathway or entranceway while placed on a cart or being carried by the second class object.

Figure 9:
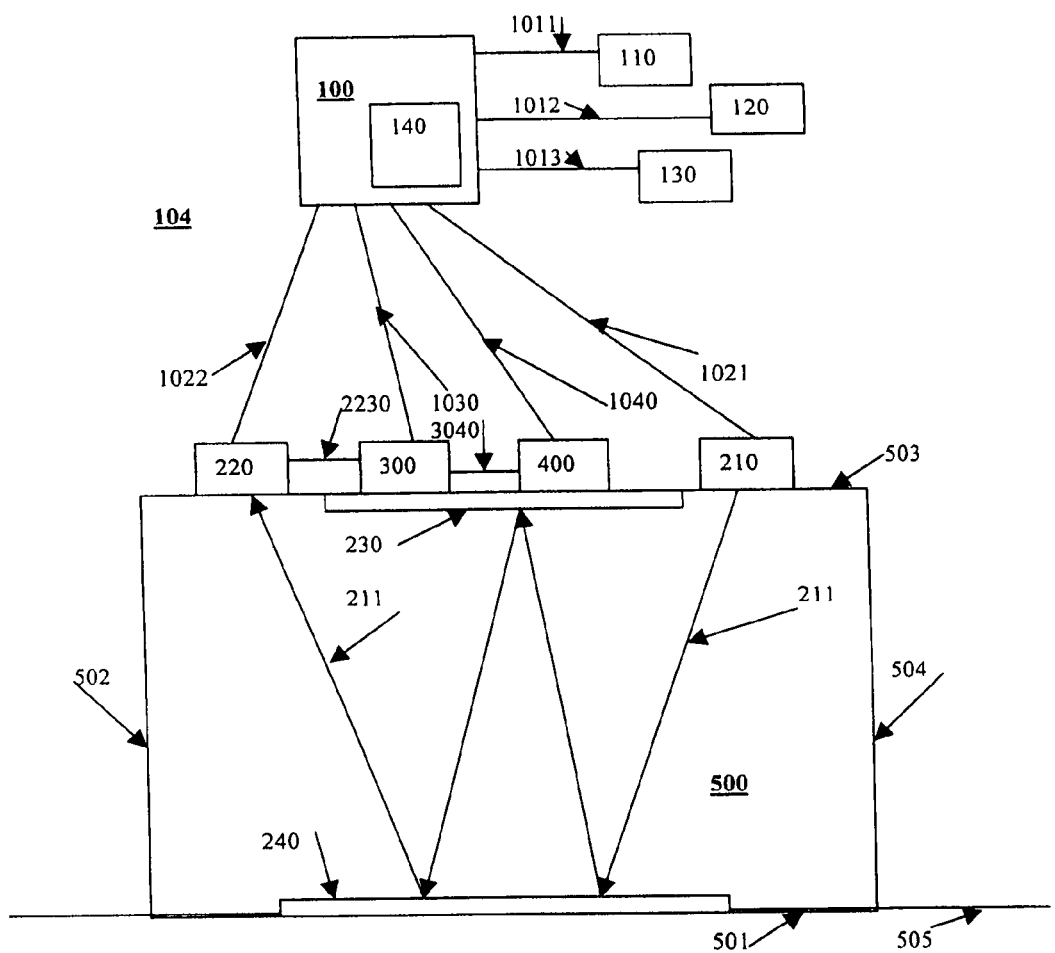
FIG. 9 is another front view of a pathway or entranceway as further modified to accommodate the present invention.

According to the present invention, when the height H of the pathway or entranceway is less than its width W then the configuration of FIGS. 2 and 9 may be preferable. In this case the universal signal transmitter and the unique identity signal receiver would be placed along the upper horizontal frame. This would accommodate the range of the low-power universal signal transmitter and the low-power unique identity signal transmitter. It may be preferable to place the low-power universal signal transmitter and the unique identity signal receiver at the middle of the upper horizontal frame. This may accommodate the horizontal position of the first class object as it passes through the pathway or entranceway while placed on a cart or being carried by the second class object or third class object.

According to the present invention, when the height H of the pathway or entranceway is much less than its width W then the configuration of FIG. 2a may be preferable. In this case a plurality of universal signal transmitter-unique identity signal receiver combinations may be placed equally distanced along the upper horizontal frame. This would accommodate the range of the low-power universal signal transmitter/low-power unique identity signal transmitter combinations. This may accommodate the horizontal position of the first class object as it passes through the pathway or entranceway while placed on a cart or being carried by the second class object.

FIGS. 7A-7G are a time-line table showing the detection, location, identity and inventory of various first class objects and second class objects according to the present invention.

In FIG. 7A, at time T(0) the first class objects comprise file set F(1,2,3) being located in Room R1; file set F(4,5,6) being located in Room R2; file set F(7,8,9) being located in Room R3; file set F(10,11,12) being located in the File Room FR; and file set F(13,14,15) being located in the Secretarial Area SA. Such file sets may comprise legal files, medical records, envelopes, boxes, tools, supplies, etc. In this particular case for illustrative purposes only such file sets comprise legal files. See FIG. 5b.

At time T(0) the second class objects comprise personnel set L(1) being located in Room R1; personnel set L(2) being located in Room R2; personnel set L(3) being located in Room R3; personnel set C(1) being located in the File Room FR; and personnel sets S(1,2) and C(2*) being located in the Secretarial Area SA. Such personnel sets may comprise legal personnel, medical personnel, etc. In this particular case for illustrative purposes only such personnel sets comprise lawyers L, clerks C, and secretaries S. See FIG. 5b.

This aforementioned defines the initial inventory. Such initial inventory information at time T(0) may be manually entered into storage means 140 via keyboard including the identity of each first class object and each second class object plus their respective initial locations. In the alternative such initial inventory information at time T(0) may be entered into storage means 140 by scanning identity code means 5004, identity code means 6004 and all other identity code means associated with all other first class objects and second class objects and by entering via keyboard their respective initial locations. See FIG. 5b.

At time T(1), lawyer L(1) exits room R1 in the possession of file F(1) and enters the secretarial area. This is detected and depicted as –F(1) and –L(1) for room R1 and +F(1) and +L(1) for the secretarial area SA. In this case motion sensor 2001 detects the presence or motion of either file F(1) or lawyer L(1) or both at pathway or entranceway or pathway 611. Motion sensor 2001 then causes universal signal transmitter 3001 to transmit the universal signal common to all universal signal transmitters. This universal signal is received and detected by universal signal receiver 6001 located on tag 6005 worn by lawyer L(1). Then universal signal receiver 6001 causes identity signal transmitter 6002 to transmit its identity signal which is assigned to tag 6005 and lawyer L(1). Then unique identity signal receiver 4001 being located at pathway or entranceway 611 receives such unique identity signal and transmits such identity signal information via signal transmitting means 1001 to CPU 100 and data storage means 140 for storage of the identity of second class object L(1), the time T(1) of such detection and the identity of such pathway or entranceway 611. As stated above motion sensor 2001 causes universal signal transmitter 3001 to transmit the universal signal common to all universal signal transmitters. This universal signal is also received and detected by universal signal receiver 5001 located on tag or label 5005 affixed to or embedded in file F(1). Universal signal receiver 5001 causes identity signal transmitter 5002 to transmit its identity signal which is assigned to tag or label 5005 and file F(1). Then unique identity signal receiver 4001 being located at pathway or entranceway 611 receives such unique identity signal and transmits such identity signal information via signal transmitting means 1001 to CPU 100 and data storage means 140 for storage of the identity of first class object F(1), the time of such detection T(1) and the identity of such pathway or entranceway 611. FIG. 10a shows this allowed or authorized detection configuration.

At time T(2), the steady state file sets and personnel sets and their respective locations are shown.

At time T(3), lawyer L(1) exits the secretarial area SA in the possession of file F(1) and enters the file room FR. This is detected and depicted as –F(1) and –L(1) for the secretarial area SA and +F(1) and +L(1) for the file room FR. In this case motion sensor 2004 detects the presence or motion of either file F(1) or lawyer L(1) or both at pathway or entranceway or pathway 641. Motion sensor 2004 then causes universal signal transmitter 3004 to transmit the universal signal common to all universal signal transmitters. This universal signal is received and detected by universal signal receiver 6001 located on tag 6005 worn by lawyer L(1). Then universal signal receiver 6001 causes identity signal transmitter 6002 to transmit its identity signal which is assigned to tag 6005 and lawyer L(1). Then unique identity signal receiver 4004 being located at pathway or entranceway 641 receives such unique identity signal and transmits such identity signal information via signal transmitting means 1004 to CPU 100 and data storage means 140 for storage of the identity of second class object L(1), the time of such detection T(3) and the identity of such pathway or entranceway 611. As stated above motion sensor 2004 causes universal signal transmitter 3004 to transmit the universal signal common to all universal signal transmitters. This universal signal is also received and detected by universal signal receiver 5001 being located on tag or label 5005 affixed to or embedded in file F(1). Universal signal receiver 5001 causes identity signal transmitter 5002 to transmit its identity signal which is assigned to tag or label 5005 and file F(1). Then unique identity signal receiver 4001 being located at pathway or entranceway 641 receives such unique identity signal and transmits such identity signal information via signal transmitting means 1004 to CPU 100 and data storage means 140 for storage of the identity of first class object F(1), the time of such detection T(3) and the identity of such pathway or entranceway 641.

At time T(4), the steady state file sets and personnel sets and their respective locations are shown.

At time T(5), lawyer L(1) exits the file room FR leaving file F(1) in the file room and enters the secretarial area SA. This is detected and depicted as −L(1) for the file room and +L(1) for the secretarial area. In this case motion sensor 2004 detects the presence or motion only of lawyer L(1) at pathway or entranceway or pathway 641. Motion sensor 2004 then causes universal signal transmitter 3004 to transmit the universal signal common to all universal signal transmitters. This universal signal is received and detected by universal signal receiver 6001 located on tag 6005 worn by lawyer L(1). Then universal signal receiver 6001 causes identity signal transmitter 6002 to transmit its identity signal which is assigned to tag 6005 and lawyer L(1). Then unique identity signal receiver 4004 being located at pathway or entranceway 641 receives such unique identity signal and transmits such identity signal information via signal transmitting means 1004 to CPU 100 and data storage means 140 for storage of the identity of second class object L(1), the time of such detection T(5) and the identity of such pathway or entranceway 641. FIG. 10*b* shows this allowed or authorized detection configuration.

At time T(6), the steady state file sets and personnel sets and their respective locations are shown.

At time T(7), lawyer L(1) exits the secretarial area and enters room R1. This is detected and depicted as −L(1) for the secretarial area +L(1) for room R1. In this case motion sensor 2001 detects only the presence or motion of lawyer L(1) at pathway or entranceway or pathway 611. Motion sensor 2001 then causes universal signal transmitter 3001 to transmit the universal signal common to all universal signal transmitters. This universal signal is received and detected by universal signal receiver 6001 located on tag 6005 worn by lawyer L(1). Then universal signal receiver 6001 causes identity signal transmitter 6002 to transmit its identity signal which is assigned to tag 6005 and lawyer L(1). Then unique identity signal receiver 4001 being located at pathway or entranceway 611 receives such unique identity signal and transmits such identity signal information via signal transmitting means 1001 to CPU 100 and data storage means 140 for storage of the identity of second class object L(1), the time of such detection T(7) and the identity of such pathway or entranceway 611.

At time T(8), the steady state file sets and personnel sets and their respective locations are shown.

At time T(9), lawyer L(2) exits room R2 in the possession of file F(4) and enters the secretarial area SA. Simultaneously lawyer L(3) exits room R3 and enters the secretarial area. This is detected and depicted as +L(2,3) for the secretarial area, −L(2) for room R2, −L(3) for room R3, and +F(4) for the secretarial area. An explanation similar to that given above with respect to lawyer L(1) and file F(1) applies in this case. Here unique identity signal receiver 4002 being located at pathway or entranceway 621 receives the unique identity signal from file F(4) and transmits such identity signal information via signal transmitting means 1002 to CPU 100 and data storage means 140 for storage of the identity of first class object F(4), the time of such detection T(9) and the identity of such pathway or entranceway 621. Similarly unique identity signal receiver 4002 being located at pathway or entranceway 621 receives the unique identity signal from lawyer L(2) and transmits such identity signal information via signal transmitting means 1002 to CPU 100 and data storage means 140 for storage of the identity of second class object L(2), the time of such detection T(9) and the identity of such pathway or entranceway 621. Also unique identity signal receiver 4003 being located at pathway or entranceway 631 receives the unique identity signal from lawyer L(3) and transmits such identity signal information via signal transmitting means 1003 to CPU 100 and data storage means 140 for storage of the identity of second class object L(3), the time of such detection T(9) and the identity of such pathway or entranceway 631.

At time T(10), the steady state file sets and personnel sets and their respective locations are shown.

At time T(11), lawyer L(2) exits the secretarial area SA without file F(4) and enters room R2. Lawyer L(3) exits the secretarial area in the possession of file F(4) and enters room R3. This is detected and depicted as +L(2) for room R2, +L(3) for room R32, +F(4) for room R3, −L(2,3) for the secretarial area, and −F(4) for the secretarial area. An explanation similar to that given above with respect to above cases or situations applies in this case.

At time T(12), the steady state file sets and personnel sets and their respective locations are shown.

At time T(13), clerk C(2*) exits the secretarial SA area and enters the file room FR. This is detected and depicted as +C(2*) for the file room and −C(2*) for the secretarial area. An explanation similar to that given above with respect to above cases or situations applies in this case. In this case however clerk C(2*) is restricted as to the files that he may posses or the locations where he may posses such files. Such restriction is stored in data storage means 140 of CPU 100. In particular the restriction that applies to clerk C(2*) is that he may posses a file in the file room but he may not posses any file anywhere else outside the file room.

At time T(14), the steady state file sets and personnel sets and their respective locations are shown.

At time T(15), clerk C(2*) exits the file room FR in the possession of file F(10) and enters room the secretarial area SA. This is detected and depicted as −F(10) and −C(2*) for the file room and +F(10) and +C(2*) for the secretarial area. In this particular case for illustrative purposes only clerk C(2*) who is designated by the asterisk is an un-authorized member of the personnel staff in that he is not authorized to remove any file from the file room. Therefore in this particular case CPU 100 activates audible alarm 110 to sound and activates monitor 120 in the secretarial area to display the words "alarm un-authorized person is exiting the file room with file F(10)". That is to say that CPU 100 detects the data entry "–F(10) and –C(2*)" as an un-authorized entry and therefore activates alarm 110 and monitor 120. Also CPU 100 may activate printer 100 to print the information displayed on monitor 120. FIG. 10*c* shows this restricted or un-authorized detection configuration.

At time T(16), the steady state file sets and personnel sets and their respective locations are shown. Again clerk C(2*) who is designated by the asterisk is an un-authorized member of the personnel staff in that he is not authorized to remove any file from the file room FR. At time T(16) CPU 100 continues to activate audible alarm 110 to sound and continues to activate monitor 120 in the secretarial area SA to display the words "ALARM/UN-authorized person C(2*) is exiting the file room with file F(10)".

At time T(17), secretary S(1) takes file F(10) from clerk C(2*), exits the secretarial room SA in the possession of file F(10), and enters the file room FR. This is detected and depicted as +F(10) and +S(1) for the file room and –F(10) and –S(1) for the secretarial area. Also at this time secretary S(1) has already de-activated CPU 100 from activating audible alarm 110 and monitor 120 in the secretarial area.

At time T(18), the steady state file sets and personnel sets and their respective locations are shown.

At time T(19), secretary S(1) exits the file room without File F(10) and enters the secretarial area SA. This is detected and depicted as –S(1) for the file room and +S(1) for the secretarial area.

At time T(20), the steady state file sets and personnel sets and their respective locations are shown.

At time T(21), secretary S(2*) exits the secretarial area SA in the possession of file F(13) and exits the office complex. This is detected and depicted as –F(13) and –S(2*) for the secretarial area and +F(13) and +S(2*) for the exit area. In this particular case for illustrative purposes only secretary S(2*) is designated by the asterisk as an un-authorized member of the personnel staff in that she is not authorized to remove any file F from the office complex. Therefore in this particular case CPU 100 activates audible alarm 110 to sound and activates monitor 120 in the secretarial area to display the words "alarm un-authorized person S(2*) is exiting the secretarial area with file F(13)". Also CPU 100 may activate printer 100 to print the information displayed on monitor 120. FIG. 10*d* shows this restricted or un-authorized detection configuration.

At time T(22), the steady state file sets and personnel sets and their respective locations are shown. Again secretary S(2*) who is designated by the asterisk is an un-authorized member of the personnel staff and is not authorized to remove any file from the office complex. At time T(22) CPU 100 continues to activate audible alarm 110 to sound and continues to activate monitor 120 in the secretarial area SA to display the words "ALARM/UN-authorized person S(2*) is exiting the secretarial area with file F(13)".

At time T(23), lawyer L(3) exits room R3 and enters the secretarial area SA. This is detected and depicted as –L(3) for room R3 and +L(3) for the secretarial area. In this particular case for illustrative purposes only CPU 100 continues to activate audible alarm 110 to sound and continues to activate monitor 120 in the secretarial area to display the words "Alarm un-authorized person S(2*) is exiting the secretarial area with file F(13)".

At time T(24), the steady state file sets and personnel sets and their respective locations are shown. At time T(24) CPU 100 continues to activate audible alarm 110 to sound and continues to activate monitor 120 in the secretarial area SA to display the words "ALARM/UN-authorized person S(2*) is exiting the secretarial area with file F(13)".

At time T(25), lawyer L(3) exits the secretarial area SA and exits the office complex. This is detected and depicted as –L(3) for the secretarial area and +L(3) for the exit area. In this particular case for illustrative purposes only CPU 100 continues to activate audible alarm 110 to sound and continues to activate monitor 120 in the secretarial area to display the words "Alarm un-authorized person S(2*) is exiting the secretarial area with file F(13)".

At time T(26), the steady state file sets and personnel sets and their respective locations are shown. CPU 100 continues to activate audible alarm 110 to sound and continues to activate monitor 120 in the secretarial area SA to display the words "ALARM/UN-authorized person S(2*) is exiting the secretarial area with file F(13)".

At time T(27), lawyer L(3) in the possession of file F(13) and secretary S(2*) leave the exit area and re-enter the secretarial area SA. This is detected and depicted as –F(13), –L(3) and –S(2*) for the exit area and +F(13), +L(3) and +S(2*) for the secretarial area. CPU 100 then de-activate audible alarm 110 and monitor 120.

At time T(28), the steady state file sets and personnel sets and their respective locations are shown.

At time T(29), unknown person X(1) enters the secretarial area SA via entrance/exit 651. This is detected and depicted as +X(1) for entrance/exit area 651 and +X(1) for the secretarial area. In this particular case for illustrative purposes CPU 100 activates audible alarm 110 to sound and activates monitor 120 in the secretarial area to display the words "Alarm un-authorized person entered the secretarial area". Unknown persons and trespassers are designated third class objects. Also CPU 100 may activate printer 100 to print the information displayed on monitor 120. FIG. 10*e* shows this restricted or un-authorized detection configuration.

At time T(30), the steady state file sets and personnel sets and their respective locations are shown.

At time T(31), unknown person X(1) in the possession of file F(13) suddenly exits the secretarial area SA via entrance/exit 651. This is detected and depicted as +X(1) and +F(13) for entrance/exit area 651 and –X(1) and –F(13) for the secretarial area. In this particular case for illustrative purposes CPU 100 continues to activate audible alarm 110 to sound and continues to activate monitor 120 in the secretarial area to display the words "Alarm un-authorized person exited the secretarial area in the possession of file F(13). Also CPU 100 may activate printer 100 to print the information displayed on monitor 120. FIG. 10*f* shows this restricted or un-authorized detection configuration.

At time T(32), the steady state file sets and personnel sets and their respective locations are shown.

At time T(33), lawyer L(3) exits the secretarial area SA in chase of unknown person X(1). This is detected and depicted as +L(3) for entrance/exit area 651 and –L(3) for the secretarial area. In this particular case for illustrative purposes CPU 100 continues to activate audible alarm 110 to sound and continues to activate monitor 120 in the secretarial area to display the words "Alarm un-authorized person exited the secretarial area in the possession of file F(13). Also CPU 100 may activate printer 100 to print the information displayed on monitor 120.

At time T(34), the steady state file sets and personnel sets and their respective locations are shown.

At time T(35), lawyer L(3) confronts unknown person X(1), takes file F(13) away from him, and re-enters the secretarial area in the possession of file F(13). This is detected and depicted as −L(3) for entrance/exit area 651, −F(13) for entrance/exit area 651, and +L(3) and +F(13) for the secretarial area. In this particular case for illustrative purposes CPU 100 stops activating audible alarm 110 to sound and stops activating monitor 120.

At time T(36), the steady state file sets and personnel sets and their respective locations are shown and all is well again.

Figure 8:
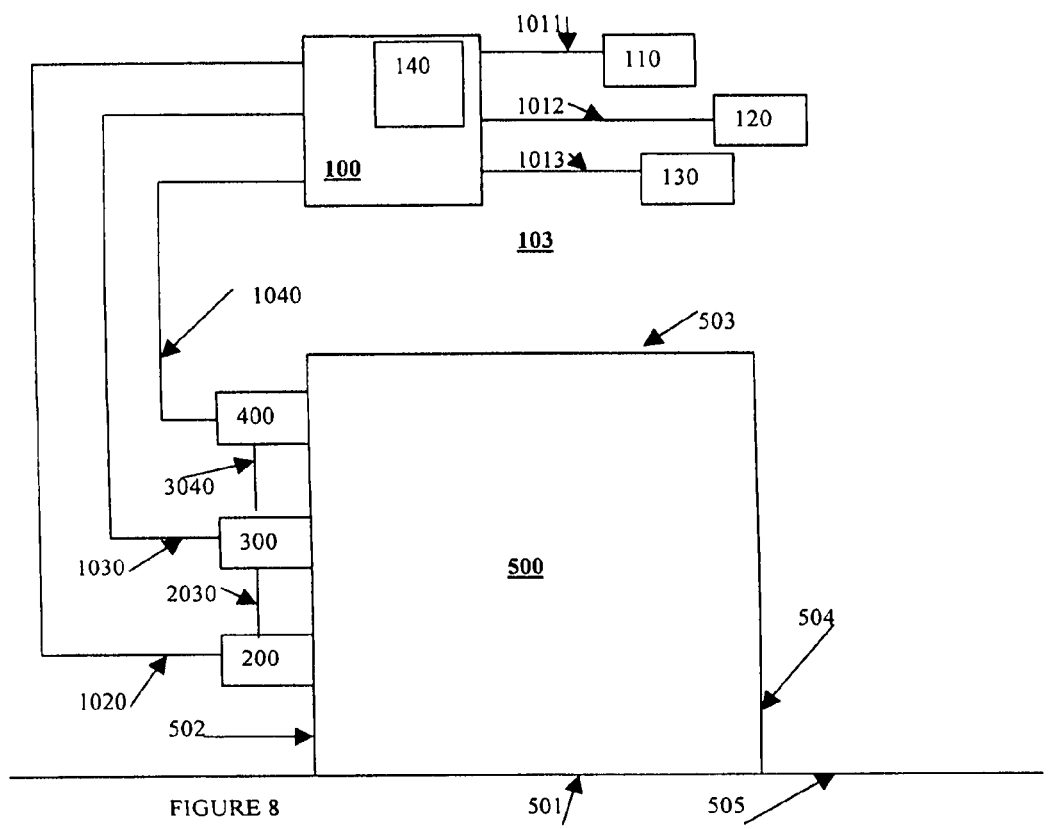
FIG. 8 is a front view of a pathway or entranceway as further modified to accommodate the present invention.

FIG. 8 is a front view of pathway or entranceway 500 as further modified to accommodate the present invention. FIG. 8 shows pathway or entranceway 500 including opening 501, left lateral vertical frame 502, upper horizontal frame 503, right lateral vertical frame 504, and floor 505. Pathway or entranceway 500 has a width W and a height H. FIG. 8 also shows Remote Dynamic Ingress/Egress Inventory Security System 103 comprising CPU 100, printer 110, display 120, alarm 130, motion sensor 200, universal signal transmitter 300, and unique identity signal receiver 400. CPU 100 further comprises data storage means 140. Signal transmitting means 1011 may allow CPU 100 and printer 110 to send signals to each other and to receive signals from each other. Signal transmitting means 1012 may allow CPU 100 and display 120 to send signals to each other and to receive signals from each other. Signal transmitting means 1013 may allow CPU 100 and alarm 130 to send signals to each other and to receive signals from each other. Signal transmitting means 1020 may allow CPU 100 and motion sensor 200 to send signals to each other and to receive signals from each other. Signal transmitting means 1030 may allow CPU 100 and universal signal transmitter 300 to send signals to each other and to receive signals from each other. Signal transmitting means 1040 may allow CPU 100 and unique identity signal receiver 400 to send signals to each other and to receive signals from each other. Signal transmitting means 2030 may allow motion sensor 200 and universal signal transmitter 300 to send signals to each other and to receive signals from each other. Signal transmitting means 3040 may allow universal signal transmitter 300 and unique identity signal receiver 400 to send signals to each other and to receive signals from each other. Each aforementioned signal transmitting means may be wired or wireless.

According to the present invention the embodiment of FIG. 8 is preferable when the height H of pathway or entranceway 500 is greater than its width W.

According to the embodiment of FIG. 8, the occupied space or volume of the motion sensing signal that emanates from motion sensor 200 may be confined to and defined by such motion sensor on the left and by the lesser depth of left lateral vertical frame 502 or right lateral vertical frame 504. According to the embodiment of FIG. 8, the occupied space or volume of the universal signal that emanates from universal signal transmitter 300 may be confined to and defined by such universal common signal transmitter on the left and by the lesser depth of left lateral vertical frame 502 or right lateral vertical frame 504. According to the embodiment of FIG. 8, the occupied space or volume of the unique identity signal being receivable by unique identity signal receiver 400 may be confined to and defined by such unique identity signal receiver on the left and by the lesser depth of left lateral vertical frame 502 or right lateral vertical frame 504.

According to the embodiment of FIG. 8, signal transmitting means 3040 may allow universal signal transmitter 300 and unique identity signal receiver 400 to send signals to each other and to receive signals from each other. Unique identity signal receiver 400 may send a first signal to universal signal transmitter 300 to temporarily stop transmitting its universal low-power signal during the time that unique identity signal receiver 400 is receiving a unique identity signal from a detected object. Unique identity signal receiver 400 may then send a second signal to universal signal transmitter 300 to continue transmitting its universal low-power signal after unique identity signal receiver 400 received a unique identity signal from such detected object.

According to the embodiment of FIG. 8, signal transmitting means 1030 may allow CPU 100 and universal signal transmitter 300 to send signals to each other and to receive signals from each other. CPU 100 may send a first signal to universal signal transmitter 300 to temporarily stop transmitting its universal low-power signal during the time that unique identity signal receiver 400 is receiving a unique identity signal from a detected object. CPU 100 may then send a second signal to universal signal transmitter 300 to continue transmitting its universal low-power signal after unique identity signal receiver 400 received a unique identity signal from such detected object.

FIG. 9 is another front view of a pathway or entranceway 500 as further modified to accommodate the present invention. FIG. 9 shows pathway or entranceway 500 including opening 501, left lateral vertical frame 502, upper horizontal frame 503, right lateral vertical frame 504, and lower horizontal frame on floor 505. FIG. 9 also shows Remote Dynamic Ingress/Egress Inventory Security System 104 comprising CPU 100, printer 110, display 120, alarm 130, a motion sensing means, universal signal transmitter 300, and unique identity signal receiver 400. CPU 100 further comprises data storage means 140. Signal transmitting means 1011 may allow CPU 100 and printer 110 to send signals to each other and to receive signals from each other. Signal transmitting means 1012 may allow CPU 100 and display 120 to send signals to each other and to receive signals from each other. Signal transmitting means 1013 may allow CPU 100 and alarm 130 to send signals to each other and to receive signals from each other. Signal transmitting means 1030 may allow CPU 100 and universal signal transmitter 300 to send signals to each other and to receive signals from each other. Signal transmitting means 1040 may allow CPU 100 and unique identity signal receiver 400 to send signals to each other and to receive signals from each other. Signal transmitting means 3040 may allow universal signal transmitter 300 and unique identity signal receiver 400 to send signals to each other and to receive signals from each other. Each aforementioned signal transmitting means may be wired or wireless.

According to the present invention the embodiment of FIG. 9 is preferable when the height H of pathway or entranceway 500 is less than its width W.

In the embodiment of FIG. 9, the motion sensing means is an optical motion sensor further comprising optical light beam generating means 210 being located on upper horizontal frame 503; optical light beam receiving means 220 being located on upper horizontal frame 503; horizontal light beam reflective strip 230 being located on upper horizontal frame 503; and horizontal light beam reflective strip 240 being located on lower horizontal frame on floor 505. The aforementioned elements are positioned such that light beam 211 emanates from optical light beam generating means 210 and successively reflects off horizontal light beam reflective strip 240 and then successively reflects off horizontal light beam reflective strip 230 until light beam 211 reaches optical light beam receiving means 220. Signal transmitting means 1022 may allow CPU 100 and optical light beam receiving means 220 to send signals to each other and to receive signals from each other. Signal transmitting means 2230 may allow optical light beam receiving means 220 and universal signal transmitter 300 to send signals to each other and to receive signals from each other. Signal transmitting means 1021 may allow CPU 100 and optical light beam generating means 210 to send signals to each other and to receive signals from each other. Each aforementioned signal transmitting means may be wired or wireless.

According to the embodiment of FIG. 9, the occupied space or volume of the optical light beam that emanates from optical light beam generating means 210 may be confined to and defined by the such optical light beam generating means above and by the area of horizontal light beam reflective strip 240 below. According to the embodiment of FIG. 9, the occupied space or volume of the universal signal that emanates from universal signal transmitter 300 may be confined to and defined by such universal signal transmitter above and by the area of horizontal light beam reflective strip 240 below. According to the embodiment of FIG. 9, the occupied space or volume of the unique identity signal being receivable by unique identity signal receiver 400 may be confined to and defined by such unique identity signal receiver above and by the area horizontal light beam reflective strip 240 below.

According to the embodiment of FIG. 9, signal transmitting means 3040 may allow universal signal transmitter 300 and unique identity signal receiver 400 to send signals to each other and to receive signals from each other. Unique identity signal receiver 400 may send a first signal to universal signal transmitter 300 to temporarily stop transmitting its universal low-power signal during the time that unique identity signal receiver 400 is receiving a unique identity signal from a detected object. Unique identity signal receiver 400 may then send a second signal to universal signal transmitter 300 to continue transmitting its universal low-power signal after unique identity signal receiver 400 received a unique identity signal from such detected object.

According to the embodiment of FIG. 9, signal transmitting means 1030 may allow CPU 100 and universal signal transmitter 300 to send signals to each other and to receive signals from each other. CPU 100 may send a first signal to universal signal transmitter 300 to temporarily stop transmitting its universal low-power signal during the time that unique identity signal receiver 400 is receiving a unique identity signal from a detected object. CPU 100 may then send a second signal to universal signal transmitter 300 to continue transmitting its universal low-power signal after unique identity signal receiver 400 received a unique identity signal from such detected object.

The various detection configurations or scenarios according to the present invention are as follows:

a. a motion sensing means at a given pathway or entranceway detects and locates the motion or presence of either a first class object or a second class object or both; the unique/identity signal receiving means associated with such pathway or entranceway receives identity signals respectively corresponding to a first class object and to an authorized second class object; the CPU stores the identity information corresponding to such first class object and to such authorized second class object; this is an acceptable scenario and the alarm means and the display means are not activated by the CPU; for illustrative purposes only this corresponds to a file being in the possession of a lawyer and being detected and located as in the above examples.

b. a motion sensing means at a given pathway or entranceway detects and locates the motion or presence of either a first class object or a second class object; the unique/identity signal receiving means associated with such pathway or entranceway receives an identity signal corresponding to an authorized second class object; the CPU stores the identity information corresponding to such authorized second class object; this is an acceptable scenario and the alarm means and the display means are not activated by the CPU; for illustrative purposes only this corresponds to a lawyer being detected and located as in the above examples.

c. a motion sensing means at a given pathway or entranceway detects and locates the motion or presence of either a first class object or a second class object or both; the unique/identity signal receiving means associated with such pathway or entranceway receives identity signals respectively corresponding to a first class object and to an un-authorized second class object; the CPU stores the identity information corresponding to such first class object and to such un-authorized second class object; this is an un-acceptable scenario and the alarm means and the display means are activated by the CPU; for illustrative purposes only this corresponds to a file being in the possession of an un-authorized clerk and being detected and located as in the above examples.

d. a motion sensing means at a given pathway or entranceway detects and locates the motion or presence of either a first class object or a second class object or both; the unique/identity signal receiving means associated with such pathway or entranceway receives an identity signal corresponding only to a first class object; the CPU stores the identity information corresponding to such first class object; this is an un-acceptable scenario and the alarm means and the display means are activated by the CPU; for illustrative purposes only this corresponds to a file being in the possession of a stranger/trespasser and being detected and located as in the above examples.

e. a motion sensing means at a given pathway or entranceway detects and locates the motion or presence of either a first class object or a second class object or both; the unique/identity signal receiving means associated with such pathway or entranceway receives an identity signal corresponding to an un-authorized second class object; the CPU stores the identity information corresponding to such un-authorized second class object; this is an un-acceptable scenario and the alarm means and the display means are activated by the CPU; for illustrative purposes only this corresponds to an un-authorized clerk being detected and located in an un-authorized room or area as in the above examples.

f. a motion sensing means at a given pathway or entranceway detects and locates the motion or presence of either a first class object or a second class object or both; the unique/identity signal receiving means associated with such pathway or entranceway does not receive an identity signal corresponding to either a first class object or to a second class object; the CPU stores the identity of the pathway or entranceway relating to this event; this is an un-acceptable scenario and the alarm means and the display means are activated by the CPU; for illustrative purposes only this corresponds to a stranger/trespasser being detected and located as in the above examples.

While the present invention has been described in terms of specific illustrative embodiments relating to a Remote Object Inventory Security System, it will be apparent to those skilled in the art that many other embodiments and modifications applicable to such System are possible within the spirit and scope of the disclosed principle.

What is claimed is:

1. A system for providing an inventory of a plurality of first class objects and a plurality of second class objects, such pluralities of objects being distributed in a first defined location and in a second defined location; such first defined location and such second defined location being accessible to each other via a common connecting pathway; said system comprising:

motion sensing means for producing a detection signal when the presence or motion of an object being either a first class object or a second class object is detected when present or moving through such common connecting pathway;

universal signal transmitting means being responsive to said detection signal when received from said motion sensing means for transmitting a universal signal;

unique identity signal detecting means for detecting the presence or absence of a unique identity signal from such detected object; each first class object and each second class object comprising means for transmitting a unique identity signal in response to said universal signal; and information storage means being responsive to said unique identity signal detecting means and being capable of storing information corresponding to the presence or absence of a unique identity signal from such detected object.

2. In the system of claim 1, said universal signal transmitting means being located at such common connecting pathway.

3. In the system of claim 1, said universal signal transmitting means being a low-power transmitting means.

4. In the system of claim 1, said universal signal transmitting means being a radio frequency identification (RFID) transmitting means.

5. In the system of claim 1, said unique identity signal detecting means being located at such common connecting pathway.

6. In the system of claim 1, said unique identity signal detecting means being a radio frequency identification (RFID) receiving means.

7. In the system of claim 1, each first class object comprising universal signal receiving means being located on or in each such first class object and being responsive to said universal signal from said universal signal transmitting means; each first class object comprising unique identity signal transmitting means being located on or in each such first class object and being responsive to its associated universal signal receiving means for transmitting a unique identity signal corresponding to the identity of such first class object; each second class object comprising universal signal receiving means being located on or in each such second class object and being responsive to said universal signal from said universal signal transmitting means; each second class object comprising unique identity signal transmitting means being located on or in each such second class object and being responsive to its associated universal signal receiving means for transmitting a unique identity signal corresponding to the identity of such second class object.

8. In the system of claim 1, a particular second class object being fully authorized and un-restricted as to its possession of a first class object as such particular second class object and such possessed first class object are present or moving through such common connecting pathway; such possessed first class object comprising universal signal receiving means being responsive to said universal signal from said universal signal transmitting means; such possessed first class object comprising unique identity signal transmitting means being responsive to its associated universal signal receiving means for transmitting a unique identity signal corresponding to the identity of such possessed first class object; said unique identity signal detecting means detecting the presence of said unique identity signal from such possessed first class object; such particular second class object comprising universal signal receiving means being responsive to said universal signal from said universal signal transmitting means; such particular second class object comprising unique identity signal transmitting means being responsive to its associated universal signal receiving means for transmitting a unique identity signal corresponding to the identity of such particular second class object; said unique identity signal detecting means detecting the presence of said unique identity signal from such particular second class object; and said information storage means being responsive to said unique identity signal detecting means for storing information corresponding to the presence of said unique identity signals from such possessed first class object and such particular second class object.

9. In the system of claim 7, a particular second class object being fully authorized and un-restricted as to its presence or motion through such common connecting pathway; the universal signal receiving means of such particular second class object being responsive to said universal signal from said universal signal transmitting means; the unique identity signal transmitting means of such particular second class object being responsive to its associated universal signal receiving means for transmitting a unique identity signal corresponding to the identity of such particular second class object; said unique identity signal detecting means detecting the presence of said unique identity signal from such particular second class object; and said information storage means being responsive to said unique identity signal detecting means for storing information corresponding to the presence of said unique identity signal from such particular second class object.

10. In the system of claim 7, a particular second class object being un-authorized and restricted as to its possession of a first class object as such particular second class object and such possessed first class object are present or moving through such common connecting pathway; the universal signal receiving means of such possessed first class object being responsive to said universal signal from said universal signal transmitting means; the unique identity signal transmitting means of such possessed first class object being responsive to its associated universal signal receiving means for transmitting a unique identity signal corresponding to the identity of such possessed first class object; said unique identity signal detecting means detecting the presence of said unique identity signal from such possessed first class object; the universal signal receiving means of such particular second class object being responsive to said universal signal from said universal signal transmitting means; the unique identity signal transmitting means of such particular second class object being responsive to its associated universal signal receiving means for transmitting a unique identity signal corresponding to the identity of such particular second class object; said unique identity signal detecting means detecting the presence of said unique identity signal from such particular second class object; said information storage means being responsive to said unique identity signal detecting means for storing information corresponding to the presence of said unique identity signals from such possessed first class object and such particular second class object; said system further comprising alarm means being responsive to said information storage means; and said information storage means activating said alarm means indicating that such particular second class object is in the un-authorized possession of such first class object and being present or moving through such common connecting pathway.

11. In the system of claim 7, a particular second class object being un-authorized and restricted as to its possession of a first class object as such particular second class object and such possessed first class object are present or moving through such common connecting pathway; the universal signal receiving means of such possessed first class object being responsive to said universal signal from said universal signal transmitting means; the unique identity signal transmitting means of such possessed first class object being responsive to its associated universal signal receiving means for transmitting a unique identity signal corresponding to the identity of such possessed first class object; said unique identity signal detecting means detecting the presence of said unique identity signal from such possessed first class object; the universal signal receiving means of such particular second class object being responsive to said universal signal from said universal signal transmitting means; the unique identity signal transmitting means of such particular second class object being responsive to its associated universal signal receiving means for transmitting a unique identity signal corresponding to the identity of such particular second class object; said unique identity signal detecting means detecting the presence of said unique identity signal from such particular second class object; said information storage means being responsive to said unique identity signal detecting means for storing information corresponding to the presence of said unique identity signals from such possessed first class object and such particular second class object; said system further comprising display means being responsive to said information storage means; and said information storage means activating said display means to display a message to the effect that such particular second class object is in the un-authorized possession of such first class object and being present or moving through such common connecting pathway.

12. In the system of claim 7, a particular second class object being un-authorized and restricted as to its possession of a first class object as such particular second class object and such possessed first class object are present or moving through such common connecting pathway; the universal signal receiving means of such possessed first class object being responsive to said universal signal from said universal signal transmitting means; the unique identity signal transmitting means of such possessed first class object being responsive to its associated universal signal receiving means for transmitting a unique identity signal corresponding to the identity of such possessed first class object; said unique identity signal detecting means detecting the presence of said unique identity signal from such possessed first class object; the universal signal receiving means of such particular second class object being responsive to said universal signal from said universal signal transmitting means; the unique identity signal transmitting means of such particular second class object being responsive to its associated universal signal receiving means for transmitting a unique identity signal corresponding to the identity of such particular second class object; said unique identity signal detecting means detecting the presence of said unique identity signal from such particular second class object; said information storage means being responsive to said unique identity signal detecting means for storing information corresponding to the presence of said unique identity signals from such possessed first class object and such particular second class object; said system further comprising printing means being responsive to said information storage means; and said information storage means activating said printing means to print a message to the effect that such particular second class object is in the un-authorized possession of such first class object and being present or moving through such common connecting pathway.

13. In the system of claim 7, a particular first class object is present or moving through such common connecting pathway, the universal signal receiving means of such possessed first class object being responsive to said universal signal from said universal signal transmitting means; the unique identity signal transmitting means of such possessed first class object being responsive to its associated universal signal receiving means for transmitting a unique identity signal corresponding to the identity of such possessed first class object; said unique identity signal detecting means detecting the presence of said unique identity signal from such possessed first class object; said information storage means being responsive to said unique identity signal detecting means for storing information corresponding to the presence of said unique identity signals from such first class object; said system further comprising alarm means being responsive to said information storage means; and said information storage means activating said alarm means indicating that an unknown person is in the un-authorized possession of such first class object and being present or moving through such common connecting pathway.

14. In the system of claim 7, a particular first class object is present or moving through such common connecting pathway; the universal signal receiving means of such possessed first class object being responsive to said universal signal from said universal signal transmitting means; the unique identity signal transmitting means of such possessed first class object being responsive to its associated universal signal receiving means for transmitting a unique identity signal corresponding to the identity of such possessed first class object; said unique identity signal detecting means detecting the presence of said unique identity signal from such possessed first class object; said information storage means being responsive only to said unique identity signal detecting means for storing information corresponding to the presence of said unique identity signals from such first class object; said system further comprising display means being responsive to said information storage means; and said information storage means activating said display means for displaying a message to the effect that an unknown person is in the un-authorized possession of such first class object and being present or moving through such common connecting pathway.

15. In the system of claim 7, a particular first class object is present or moving through such common connecting pathway; the universal signal receiving means of such possessed first class object being responsive to said universal signal from said universal signal transmitting means; the unique identity signal transmitting means of such possessed first class object being responsive to its associated universal signal receiving means for transmitting a unique identity signal corresponding to the identity of such possessed first class object; said unique identity signal detecting means detecting the presence of said unique identity signal from such possessed first class object; said information storage means being responsive only to said unique identity signal detecting means for storing information corresponding to the presence of said unique identity signals from such first class object; said system further comprising printing means being responsive to said information storage means; and said information storage means activating said printing means for printing a message to the effect that an unknown person is in the un-authorized possession of such first class object and being present or moving through such common connecting pathway.

16. In the system of claim 1, an unknown object or person is present or moving through such common connecting pathway; said motion sensing means produces a detection signal when the presence or motion of such unknown object or person is present or passing through such common connecting pathway; said universal signal transmitting means being responsive to said detection signal from said motion sensing means for transmitting a universal signal; said unique identity signal detecting means failing to detect the presence of a unique identity signal from a first class object or a second class object; said information storage means storing information corresponding to the absence of a unique identity signal from a first class object or a second class object; said system further comprising alarm means being responsive to said information storage means; and said information storage means activating said alarm means meaning that an unknown object or person is present or moving through such common connecting pathway.

17. In the system of claim 1, an unknown object or person is present or moving through such common connecting pathway; said motion sensing means produces a detection signal when the presence or motion of such unknown object or person is present or passing through such common connecting pathway; said universal signal transmitting means being responsive to said detection signal from said motion sensing means for transmitting a universal signal; said unique identity signal detecting means failing to detect the presence of a unique identity signal from a first class object or a second class object; said information storage means storing information corresponding to the absence of a unique identity signal from a first class object or a second class object; said system further comprising display means being responsive to said information storage means; and said information storage means activating said display means for displaying a message to the effect that an unknown object or person is present or moving through such common connecting pathway.

18. In the system of claim 1, an unknown object or person is present or moving through such common connecting pathway; said motion sensing means produces a detection signal when the presence or motion of such unknown object or person is present or passing through such common connecting pathway; said universal signal transmitting means being responsive to said detection signal from said motion sensing means for transmitting a universal signal; said unique identity signal detecting means failing to detect the presence of a unique identity signal from a first class object or a second class object; said information storage means storing information corresponding to the absence of a unique identity signal from a first class object or a second class object; said system further comprising printing means being responsive to said information storage means; and said information storage means activating said printing means for printing a message to the effect that an unknown object or person is present or moving through such common connecting pathway.

19. In the system of claim 1, said unique identity signal detecting means sending a first signal to said universal signal transmitting means for temporarily stopping the transmission of its universal signal during the time that said unique identity signal detecting means is receiving a unique identity signal from a detected object; and said unique identity signal detecting means sending a second signal to said universal signal transmitting means to resume transmitting its universal signal after said unique identity signal detecting means has finished receiving a unique identity signal from such detected object.

20. In the system of claim 1, said information storage means sending a first signal to said universal signal transmitting means for temporarily stopping the transmission of its universal signal during the time that said unique identity signal detecting means is receiving a unique identity signal from a detected object; and said information storage means sending a second signal to said universal signal transmitting means to resume transmitting its universal signal after said unique identity signal receiving means has finished receiving a unique identity signal from such detected object.

21. A system for providing an inventory of a plurality of first class objects and a plurality of second class objects; such pluralities of objects being distributed in a first defined location and in a second defined location; such first defined location and such second defined location being accessible to each other via a connecting pathway; said system comprising:

motion sensing means being located at such connecting opening for producing a first detection signal when the presence or motion of a first class object is detected or for producing a second detection signal when the presence or motion of a second class object is detected when present or moving through such connecting opening;

universal signal transmitting means being located at such connecting opening and being responsive to said detection signal when received from said motion sensing means for transmitting a universal common low-power signal;

object signal receiving means being located on such detected object and being responsive to said universal common low-power signal when received from said universal signal transmitting means;

object unique identity signal transmitting means being located on such detected object and being responsive to said object signal receiving means for transmitting a unique identity low-power signal corresponding to the identity of such detected object;

unique identity signal receiving means being located at such connecting opening and being responsive to said unique identity signal when received from said object identity signal transmitting means; and information storage means being responsive to said unique identity signal receiving means and being capable of storing information corresponding to the identity of such detected object, the time when such object was detected, and the location of such connecting opening.

22. In the system of claim 21, said system also comprising display means; said display means being responsive to said information storage means for displaying information corresponding to the identity of such detected object, the time when such object was detected, and the location of such connecting opening.

23. In the system of claim 21, said system also comprising printing means; said printing means being responsive to said information storage means for printing information corresponding to the identity of such detected object, the time when such object was detected, and the location of such connecting opening.

24. In the system of claim 21, said motion sensing means producing a second detection signal when the motion of a second object passing through such connecting opening is successively or contemporaneously detected; said universal signal transmitting means being responsive to said second detection signal from said motion sensing means for transmitting said universal common low-power signal; second object universal signal receiving means being located on such second detected object and being responsive to said universal common low-power signal from said universal common signal transmitting means; second object signal transmitting means being located on such second detected object and being responsive to said second object signal receiving means for transmitting a unique identity low-power signal corresponding to the identity of such second detected object; said unique identity signal receiving means being responsive to said unique identity signal being transmitted by said second detected object signal transmitting means; said information storage means being responsive to said unique identity signal receiving means for successively or contemporaneously storing information corresponding to the identity of such second detected object, the time when such second object was detected, and the location identity of such connecting opening; one of said detected objects being a first class object and being part of a list of authorized objects stored in said information storage means; and the other of said detected objects being a second class object and being part of a list of authorized or un-authorized persons stored in said information storage means.

25. In the system of claim 21, said system also comprising alarm means; said information storage means activating said alarm means when said unique identity signal receiving means receives a first unique identity signal from a detected first class object and a second unique identity signal from an un-authorized detected second class object.

26. In the system of claim 21, said system also comprising display means; said information storage means activating said display means when said unique identity signal receiving means receives a first unique identity signal from a detected first class object and a second unique identity signal from an un-authorized detected second class object for displaying such information.

27. In the system of claim 21, said system also comprising printing means; said information storage means activating said printing means when said unique identity signal receiving means receives a first unique identity signal from a detected first class object and a second unique identity signal from an un-authorized detected second class object for printing such information.

28. In the system of claim 21, said system also comprising alarm means; said information storage means activating said alarm means when said unique identity signal receiving means receives only a unique identity signal from a detected first class object.

29. In the system of claim 21, said system also comprising display means; said information storage means activating said display means when said unique identity signal receiving means receives only a unique identity signal from a detected first class object for displaying such information.

30. In the system of claim 21, said system also comprising printing means; said information storage means activating said printing means when said unique identity signal receiving means receives only a first unique identity signal from a detected first class object for printing such information.

31. In the system of claim 21, said system also comprising alarm means; said motion sensing means producing a detection signal when the presence or motion of an unknown object or unknown person is detected while passing through such connecting opening; said universal signal transmitting means being responsive to said detection signal from said motion sensing means for transmitting a universal common low-power signal; said information storage means activating said alarm means when said unique identity signal receiving means fails to receive any unique identity signal.

32. In the system of claim 21, said system also comprising display means; said motion sensing means producing a detection signal when the presence or motion of an unknown object or unknown person is detected while passing through such connecting opening; said universal signal transmitting means being responsive to said detection signal from said motion sensing means for transmitting a universal common low-power signal; said information storage means activating said display means when said unique identity signal receiving means fails to receive any unique identity signal for displaying a message as to the detection of the presence or motion of an unknown object or an unknown person.

33. In the system of claim 21, said system also comprising printing means; said motion sensing means producing a detection signal when the presence or motion of an unknown object or unknown person is detected while passing through such connecting opening; said universal signal transmitting means being responsive to said detection signal from said motion sensing means for transmitting a universal common low-power signal; said information storage means activating said printing means when said unique identity signal receiving means fails to receive any unique identity signal for printing a message as to the detection of the presence or motion of an unknown object or an unknown person.

34. In the system of claim 21, said system also comprising alarm means; said information storage means activating said alarm means when said unique identity signal receiving means receives only a unique identity signal from a detected first class object; and said detected first class object being part of a list of inventory stored in said information storage means.

35. In the system of claim 21, said system also comprising display means; said information storage means activating said display means when said unique identity signal receiving means receives only a unique identity signal from a detected first class object; said detected first class object being part of a list of inventory stored in said information storage means; said display means displaying a message to the effect that no unique identity signal from a second class object was received.

36. In the system of claim 21, said system also comprising printing means; said information storage means activating said printing means when said unique identity signal receiving means receives only a unique identity signal from a detected first class object; said first class object being part of a list of inventory stored in said information storage means; said printing means printing a message to the effect that no unique identity signal from a second class object was received.

37. In the system of claim 21, said system also comprising alarm means; said information storage means activating said alarm means when said unique identity signal receiving means receives a unique identity signal corresponding to the identity of a first class object but does not contemporaneously receive a unique identity signal corresponding to the identity of any second class object; said first class object being represented in a pre-stored list in said information storage means.

38. In the system of claim 21, said system also comprising display means; said information storage means activating said display means when said unique identity signal receiving means receives a unique identity signal corresponding to the identity of a first class object but does not contemporaneously receive a unique identity signal corresponding to the identity of any second class object; said first class object being represented in a pre-stored list in said information storage means; said display means displaying a message to the effect that no unique identity signal was received corresponding to the identity of any second class object.

39. In the system of claim 21, said system also comprising printing means; said information storage means activating said printing means when said unique identity signal receiving means receives a unique identity signal corresponding to the identity of a first class object but does not contemporaneously receive any unique identity signal corresponding to the identity of any second class object; said first class object being represented in a pre-stored list in said information storage means; said printing means printing a message to the effect that no unique identity signal was received corresponding to the identity of any second class object.

40. In the system of claim 21, said unique identity signal receiving means sending a first signal to said universal signal transmitting means for temporarily stopping the transmission of its universal signal during the time that said unique identity signal receiving means is receiving a unique identity signal from a detected object; and said unique identity signal receiving means sending a second signal to said universal signal transmitting means to resume transmitting its universal signal after said unique identity signal receiving means has finished receiving a unique identity signal from such detected object.

41. In the system of claim 21, said information storage means sending a first signal to said universal signal transmitting means for temporarily stopping the transmission of its universal signal during the time that said unique identity signal receiving means is receiving a unique identity signal from a detected object; and said information storage means sending a second signal to said universal signal transmitting means to resume transmitting its universal signal after said unique identity signal receiving means has finished receiving a unique identity signal from such detected object.

42. A system for providing inventory and location information for a plurality of objects, said system comprising:

motion sensing means being located on the first lateral side of an opening for producing a detection signal when the motion or presence of an object is detected; such opening also having a second lateral side; the width of such opening between such lateral sides being less than the height of such opening;

universal common low-power signal transmitting means being located on such first lateral side and being responsive to said detection signal when received from said motion sensing means for transmitting a universal common low-power signal;

object signal receiving means being located on such detected object and being responsive to said universal common low-power signal when received from said universal common low-power signal transmitting means;

object signal transmitting means being located on such detected object and being responsive to said object signal receiving means for transmitting a unique low-power identity signal corresponding to the identity of such detected object;

unique identity signal receiving means being located on such first lateral side and being responsive to said unique identity signal when received from said object signal transmitting means; and information storage means being responsive to said unique identity signal receiving means and being capable of storing information corresponding to the identity of such detected object, the time when such object was detected, and the identity of such opening.

43. In the system of claim 42, said universal common low-power signal transmitting means transmitting its universal signal for less than or equal to one second.

44. In the system of claim 42, said object signal transmitting means transmitting its unique identity signal for less than or equal to ½ second.

45. In the system of claim 42, said universal common low-power signal transmitting means transmitting its universal signal with a low-power range equal to the width of such opening.

46. In the system of claim 42, said object signal transmitting means transmitting its unique identity signal with a low-power range equal to the width of such opening.

47. In the system of claim 42, said unique identity signal receiving means sending a first signal to said universal signal transmitting means for temporarily stopping the transmission of its universal signal during the time that said unique identity signal receiving means is receiving a unique identity signal from a detected object; and said unique identity signal receiving means sending a second signal to said universal signal transmitting means to resume transmitting its universal signal after said unique identity signal receiving means has finished receiving a unique identity signal from such detected object.

48. In the system of claim 42, said information storage means sending a first signal to said universal signal transmitting means for temporarily stopping the transmission of its universal signal during the time that said unique identity signal receiving means is receiving a unique identity signal from a detected object; and said information storage means sending a second signal to said universal signal transmitting means to resume transmitting its universal signal after said unique identity signal receiving means has finished receiving a unique identity signal from such detected object.

49. A system for providing inventory and location information for a plurality of objects, said system comprising:

motion sensing means being located on the upper side of an opening for producing a detection signal when the presence or motion of an object is detected; such opening also having a lower side; the height of such opening between its upper and lower sides being less than the width of such opening;

universal common low-power signal transmitting means being located on such upper side and being responsive to said detection signal when received from said motion sensing means for transmitting a universal common low-power signal;

object signal receiving means being located on such detected object and being responsive to said universal common low-power signal when received from said universal common low-power signal transmitting means;

object signal transmitting means being located on such detected object and being responsive to said object signal receiving means for transmitting a unique low-power identity signal corresponding to the identity of such detected object;

unique identity signal receiving means being located on such upper side and being responsive to said unique identity signal when received from said object signal transmitting means; and information storage means being responsive to said unique identity signal receiving means being capable of storing information corresponding to the identity of such detected object, the time when such object was detected, and the identity of such opening.

50. In the system of claim 49, said universal common low-power signal transmitting means transmitting its universal signal for less than or equal to one second.

51. In the system of claim 49, said object signal transmitting means transmitting its unique identity signal for less than or equal to ½ second.

52. In the system of claim 49, said universal common low-power signal transmitting means transmitting its universal signal with a low-power range equal to the height of such opening.

53. In the system of claim 49, said object signal transmitting means transmitting its unique identity signal with a low-power range equal to the height of such opening.

54. In the system of claim 49, said unique identity signal receiving means sending a first signal to said universal signal transmitting means for temporarily stopping the transmission of its universal signal during the time that said unique identity signal receiving means is receiving a unique identity signal from a detected object; and said unique identity signal receiving means sending a second signal to said universal signal transmitting means to resume transmitting its universal signal after said unique identity signal receiving means has finished receiving a unique identity signal from such detected object.

55. In the system of claim 49, said information storage means sending a first signal to said universal signal transmitting means for temporarily stopping the transmission of its universal signal during the time that said unique identity signal receiving means is receiving a unique identity signal from a detected object; and said information storage means sending a second signal to said universal signal transmitting means to resume transmitting its universal signal after said unique identity signal receiving means has finished receiving a unique identity signal from such detected object.

56. A system for providing inventory and location information for a plurality of objects, said system comprising:

a plurality of motion sensing means being uniformly linearly distributed along the upper side of an opening for producing at least one detection signal when the presence or motion of an object is detected; such opening also having a lower side; the height of such opening between such upper and lower sides being much less than the width of such opening;

a plurality of universal common low-power signal transmitting means also being uniformly linearly distributed along the upper side of such opening; each particular universal common low-power signal transmitting means being associated with only one particular motion sensing means; each particular universal common low-power signal transmitting means being placed in close proximity to its particular motion sensing means; at least one particular universal common low-power signal transmitting means being responsive to the detection signal when produced from its associated particular motion sensing means for transmitting a universal common low-power signal;

object signal receiving means being located on such detected object and being responsive to at least one universal common low-power signal when received from at least one particular universal common low-power signal transmitting means;

object signal transmitting means being located on such detected object and being responsive to said object signal receiving means for transmitting at least one unique low-power identity signal corresponding to the identity of such detected object;

a plurality of unique identity signal receiving means also being uniformly linearly distributed along the upper side of such opening; each particular unique identity signal receiving means being associated with only one particular motion sensing means and with only one particular universal common low-power signal transmitting means; each particular unique identity signal receiving means being placed in close proximity to its particular motion sensing means and to its particular universal common low-power signal transmitting means; at least one particular unique identity signal receiving means being responsive to at least one unique identity signal when received from said object signal transmitting means; and information storage means being responsive to each particular unique identity signal receiving means and being capable of storing information corresponding to the identity of such detected object, the time when such object was detected, and the identity of such opening.

57. In the system of claim 56, each particular common low-power signal transmitting means transmitting its universal signal for less than or equal to one second.

58. In the system of claim 56, said object signal transmitting means transmitting its unique identity signal for less than or equal to ½ second.

59. In the system of claim 56, each particular universal common low-power signal transmitting means transmitting its universal signal with a low-power range equal to the height of such opening.

60. In the system of claim 56, said object signal transmitting means transmitting its unique identity signal with a low-power range equal to the height of such opening.

61. In the system of claim 56, accessible code means being located on such object, said code corresponding to the identity of such object.

62. In the system of claim 61, said accessible code means being bar code means, said code corresponding to the identity of such object.

63. In the system of claim 61, said accessible code means being magnetic code readable means, said code corresponding to the identity of such object.

64. In the system of claim 56, each unique identity signal receiving means sending a first signal to its associated universal signal transmitting means for temporarily stopping the transmission of its universal signal during the time that said unique identity signal receiving means is receiving a unique identity signal from a detected object; and unique identity signal receiving means sending a second signal to its associated said universal signal transmitting means to resume transmitting its universal signal after said unique identity signal receiving means has finished receiving a unique identity signal from such detected object.

65. In the system of claim 56, said information storage means sending a first signal to a universal signal transmitting means for temporarily stopping the transmission of its universal signal during the time that its associated unique identity signal receiving means is receiving a unique identity signal from a detected object; and said information storage means sending a second signal to said universal signal transmitting means to resume transmitting its universal signal after its associated unique identity signal receiving means has finished receiving a unique identity signal from such detected object.

66. A system for providing inventory and location information for a plurality of objects, said system comprising:
motion sensing means being located on the first vertical lateral side of an opening for producing a detection signal when the presence or motion of an object is detected; such opening also having a second vertical lateral side; the width of such opening between such lateral sides being less than the height of such opening;
said motion sensing means further comprising directed light source means being located at the first end of such first vertical lateral side, a first linear light reflective strip running from the first end to the second end of such first vertical lateral side, a second linear light reflective strip running from the first end to the second end of such second vertical lateral side, and a light detecting means being located at the second end of such first vertical lateral side; wherein the light beam emanating from said directed light source means takes a reflective path to said light detecting means; and wherein said motion sensing means responds to the interruption of said light beam path when an object is present or moving within such opening for producing said detection signal indicating such light path interruption;
universal common low-power signal transmitting means being located on such first lateral side and being responsive to said detection signal when received from said motion sensing means for transmitting a universal common low-power signal;
object signal receiving means being located on such detected object and being responsive to said universal common low-power signal when received from said universal common low-power signal transmitting means;
object signal transmitting means being located on such detected object and being responsive to said object signal receiving means for transmitting a unique low-power identity signal corresponding to the identity of such detected object;
unique identity signal receiving means being located on such first lateral side and being responsive to said unique identity signal when received from said object signal transmitting means; and
information storage means being responsive to said unique identity signal receiving means and being capable of storing information corresponding to the identity of such detected object, the time when such object was detected, and the identity of such opening.

67. In the system of claim 66, said universal common low-power signal transmitting means transmitting its universal signal for less than or equal to one second.

68. In the system of claim 66, said object signal transmitting means transmitting its unique identity signal for less than or equal to ½ second.

69. In the system of claim 66, said universal common low-power signal transmitting means transmitting its universal signal with a low-power range equal to the width of such opening.

70. In the system of claim 66, said object signal transmitting means transmitting its unique identity signal with a low-power range equal to the width of such opening.

71. In the system of claim 66, said unique identity signal receiving means sending a first signal to said universal signal transmitting means for temporarily stopping the transmission of its universal signal during the time that said unique identity signal receiving means is receiving a unique identity signal from a detected object; and said unique identity signal receiving means sending a second signal to said universal signal transmitting means to resume transmitting its universal signal after said unique identity signal receiving means has finished receiving a unique identity signal from such detected object.

72. In the system of claim 66, said information storage means sending a first signal to said universal signal transmitting means for temporarily stopping the transmission of its universal signal during the time that associated unique identity signal receiving means is receiving a unique identity signal from a detected object; and said information storage means sending a second signal to said universal signal transmitting means to resume transmitting its universal signal after its associated unique identity signal receiving means has finished receiving a unique identity signal from such detected object.

73. A method for providing an inventory of a plurality of first class objects and a plurality of second class objects, such pluralities of objects being distributed in a first defined location and in a second defined location; such first defined location and such second defined location being accessible to each other via a common connecting pathway; said method comprising the steps of:
detecting the presence or motion of an object being either a first class object or a second class object when present or passing through such common connecting pathway and producing a detection signal in response thereto;
transmitting a universal common low-power signal in response to said detection signal;
detecting the presence or absence of a unique identity signal from such detected object; each first class object and each second class object being capable of transmitting its own unique identity signal in response to said universal signal; and
storing information corresponding to the presence or absence of a unique identity signal from such detected object.

74. In the method of claim 73, temporarily stopping the transmission of said universal signal during the time that said unique identity signal is being received from a detected object; and resuming the transmission of said universal signal after said unique identity signal is finished being received from such detected object.

75. A method for providing an inventory of a plurality of first class objects and a plurality of second class objects; such pluralities of objects being distributed in a first defined location and in a second defined location; such first defined location and such second defined location being accessible to each other via a connecting pathway; said method comprising the steps of:
detecting the presence or motion of a first class object or a second class object while passing through such connecting pathway and producing a detection signal in response thereto;
transmitting a universal common low-power signal in response to said detection signal;

said detected object receiving said universal common low-power signal and producing an internal signal in response thereto;

said detected object transmitting its own unique identity low-power signal corresponding to the identity of said detected object in response to said internal signal;

receiving said unique identity signal from said detected object; and storing information corresponding to the identity of said detected object, the time when said object was detected, and the location of such connecting pathway.

76. In the method of claim 75, temporarily stopping the transmission of said universal signal during the time that said unique identity signal is being received from a detected object; and resuming the transmission of said universal signal after said unique identity signal is finished being received from such detected object.

77. A system for providing inventory and location information for a plurality of objects being located in a plurality of defined locations, each defined location having at least one common pathway with at least one other defined location, said system comprising:

a plurality of motion sensing means each being associated with a respective pathway for producing a detection signal when the motion or presence of an object is detected;

a plurality of universal common low-power signal transmitting means each being associated with only one particular motion sensing means; each associated universal common low-power signal transmitting means being located in close proximity to its associated common pathway; each universal common low-power signal transmitting means being responsive to the detection signal when received from its associated motion sensing means for transmitting a universal common low-power signal;

object signal receiving means being located on such detected object and being responsive to the universal common low-power signal when received from said universal common low-power signal transmitting means;

object signal transmitting means being located on such detected object and being responsive to said object signal receiving means for transmitting its own unique low-power identity signal corresponding to the identity of such detected object;

a plurality of unique identity signal receiving means each being associated with one motion sensing means and with one universal common low-power signal transmitting means; each unique identity signal receiving means being placed in close proximity to its associated common pathway; said associated unique identity signal receiving means being responsive to the unique identity signal received from said object signal transmitting means; and information storage means being responsive to said unique identity signal receiving means and being capable of storing information corresponding to the identity of such detected object, the time when such object was detected, and the identity of such common pathway.

78. In the system of claim 77, each unique identity signal receiving means sending a first signal to its associated universal signal transmitting means for temporarily stopping the transmission of its universal signal during the time that said unique identity signal receiving means is receiving a unique identity signal from a detected object; and unique identity signal receiving means sending a second signal to its associated said universal signal transmitting means to resume transmitting its universal signal after said unique identity signal receiving means has finished receiving a unique identity signal from such detected object.

79. In the system of claim 77, said information storage means sending a first signal to a universal signal transmitting means for temporarily stopping the transmission of its universal signal during the time that its associated unique identity signal receiving means is receiving a unique identity signal from a detected object; and said information storage means sending a second signal to said universal signal transmitting means to resume transmitting its universal signal after its associated unique identity signal receiving means has finished receiving a unique identity signal from such detected object.

80. A system for providing inventory and location information for a plurality of objects, said system comprising:

motion sensing means being located on the upper horizontal side of an opening for producing a detection signal when the presence or motion of an object is detected; such opening also having a lower horizontal side; the height of such opening between such horizontal sides being less than the width of such opening;

said motion sensing means further comprising directed light source means being located at the first end of such upper horizontal side, a first linear light reflective strip running from the first end to the second end of such upper horizontal side, a second linear light reflective strip running from the first end to the second end of such lower horizontal side, and a light detecting means being located at the second end of such upper horizontal side; wherein said light beam emanating from said directed light source means takes a reflective path to said light detecting means; and wherein said motion sensing means responds to the interruption of said light beam path when an object is present or moving within such opening for producing said detection signal indicating such light path interruption;

universal common low-power signal transmitting means being located on such upper horizontal side and being responsive to said detection signal when received from said motion sensing means for transmitting a universal common low-power signal;

object signal receiving means being located on such detected object and being responsive to said universal common low-power signal when received from said universal common low-power signal transmitting means;

object signal transmitting means being located on such detected object and being responsive to said object signal receiving means for transmitting a unique low-power identity signal corresponding to the identity of such detected object;

unique identity signal receiving means being located on such upper horizontal side and being responsive to said unique identity signal when received from said object signal transmitting means; and information storage means being responsive to said unique identity signal receiving means and being capable of storing information corresponding to the identity of such detected object, the time when such object was detected, and the identity of such opening.

81. In the system of claim 80, said universal common low-power signal transmitting means transmitting its universal signal for less than or equal to one second.

82. In the system of claim 80, said object signal transmitting means transmitting its unique identity signal for less than or equal to ½ second.

83. In the system of claim 80, said universal common low-power signal transmitting means transmitting its universal signal with a low-power range equal to the height of such opening.

84. In the system of claim 81, said object signal transmitting means transmitting its unique identity signal with a low-power range signal equal to the height of such opening.

85. In the system of claim 80, said unique identity signal receiving means sending a first signal to said universal signal transmitting means for temporarily stopping the transmission of its universal signal during the time that said unique identity signal receiving means is receiving a unique identity signal from a detected object; and said unique identity signal receiving means sending a second signal to said universal signal transmitting means to resume transmitting its universal signal after said unique identity signal has finished receiving means received a unique identity signal from such detected object.

86. In the system of claim 80, said information storage means sending a first signal to said universal signal transmitting means for temporarily stopping the transmission of its universal signal during the time that associated unique identity signal receiving means is receiving a unique identity signal from a detected object; and said information storage means sending a second signal to said universal signal transmitting means to resume transmitting its universal signal after its associated unique identity signal receiving means has finished receiving a unique identity signal from such detected object.

* * * * *